US012799633B2

(12) United States Patent
Barnholtz et al.

(10) Patent No.: US 12,799,633 B2
(45) Date of Patent: Nov. 17, 2026

(54) PROCESS FOR MAKING FIBROUS STRUCTURES

(71) Applicant: The Procter & Gamble Company, Cincinnati, OH (US)

(72) Inventors: Steven Lee Barnholtz, West Chester, OH (US); Douglas Jay Barkey, Maineville, OH (US); Jonathan Paul Brennan, Cincinnati, OH (US); Ronald Thomas Gorley, Cincinnati, OH (US); Michael Donald Suer, Cincinnati, OH (US); Paul Dennis Trokhan, Hamilton, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 23 days.

(21) Appl. No.: 19/056,815

(22) Filed: Feb. 19, 2025

(65) Prior Publication Data

US 2025/0188648 A1 Jun. 12, 2025

Related U.S. Application Data

(63) Continuation of application No. 17/729,323, filed on Apr. 26, 2022, now Pat. No. 12,258,684, which is a (Continued)

(51) Int. Cl.

*D01D 5/08* (2006.01)
*B32B 5/02* (2006.01)

(Continued)

(52) U.S. Cl.

CPC ........... *D01D 5/0985* (2013.01); *B32B 5/022* (2013.01); *B32B 37/203* (2013.01); *D01F 6/625* (2013.01);

(Continued)

(58) Field of Classification Search

CPC .......... D01D 5/08; D01D 5/0985; D01D 7/00; D04H 1/26; D04H 1/4309; D04H 1/4334; D04H 1/435; D04H 1/56; D04H 3/007; D04H 3/009; D04H 3/011; D04H 3/015; D04H 3/16; D04H 5/06; D10B 2201/20;

(Continued)

(56) References Cited

U.S. PATENT DOCUMENTS 2,008,031 A 7/1935 Arthur
2,175,045 A 10/1939 Rudolf (Continued)

FOREIGN PATENT DOCUMENTS

DE 19959832 A1 7/2001
EP 0080382 A1 6/1983

(Continued)

OTHER PUBLICATIONS

All Office Actions, U.S. Appl. No. 12/170,585, filed Jul. 10, 2008.

(Continued)

*Primary Examiner* — Leo B Tentoni
(74) *Attorney, Agent, or Firm* — James E. Oehlenschlager

(57) ABSTRACT

Processes for making fibrous structures and more particularly processes for making fibrous structures comprising filaments are provided.

14 Claims, 12 Drawing Sheets

Related U.S. Application Data continuation of application No. 16/702,920, filed on Dec. 4, 2019, now Pat. No. 11,326,276, which is a continuation of application No. 15/891,726, filed on Feb. 8, 2018, now Pat. No. 10,513,801, which is a continuation of application No. 14/475,699, filed on Sep. 3, 2014, now Pat. No. 9,926,648, which is a continuation of application No. 12/170,575, filed on Jul. 10, 2008, now Pat. No. 8,852,474.

(60) Provisional application No. 60/959,885, filed on Jul. 17, 2007.

(51) Int. Cl.

| | |
|---|---|
| ***B32B 37/20*** | (2006.01) |
| ***D01D 5/098*** | (2006.01) |
| ***D01D 7/00*** | (2006.01) |
| ***D01F 6/62*** | (2006.01) |
| ***D04H 1/26*** | (2012.01) |
| ***D04H 1/425*** | (2012.01) |
| ***D04H 1/4291*** | (2012.01) |
| ***D04H 1/4309*** | (2012.01) |
| ***D04H 1/4334*** | (2012.01) |
| ***D04H 1/435*** | (2012.01) |
| ***D04H 1/56*** | (2006.01) |
| ***D04H 3/007*** | (2012.01) |
| ***D04H 3/009*** | (2012.01) |
| ***D04H 3/011*** | (2012.01) |
| ***D04H 3/015*** | (2012.01) |
| ***D04H 3/16*** | (2006.01) |
| ***D04H 5/06*** | (2006.01) |

(52) U.S. Cl.

CPC ........... *D04H 1/425* (2013.01); *D04H 1/4291* (2013.01); *D04H 1/56* (2013.01); *D04H 1/565* (2013.01); *D04H 3/16* (2013.01); *D04H 5/06* (2013.01); *D10B 2201/22* (2013.01); *D10B 2321/02* (2013.01); *D10B 2321/022* (2013.01); *D10B 2321/06* (2013.01); *D10B 2331/02* (2013.01); *D10B 2331/04* (2013.01); *D10B 2331/041* (2013.01); *D10B 2401/12* (2013.01); *D10B 2509/026* (2013.01)

(58) Field of Classification Search

CPC .......... D10B 2321/02; D10B 2321/022; D10B 2321/06; D10B 2331/02; D10B 2331/04; D10B 2331/041; D10B 2401/12

USPC ..... 264/6, 103, 211.12, 330, 331.17, 331.19, 264/331.21, 518, 555

See application file for complete search history.

(56) References Cited

U.S. PATENT DOCUMENTS

| | | | | |
|---|---|---|---|---|
| 3,521,638 A | | 7/1970 | Parrish | |
| 3,825,379 A | | 7/1974 | Lohkamp et al. | |
| 3,838,692 A | | 10/1974 | Levesque | |
| 3,954,361 A | | 5/1976 | Page | |
| 4,100,324 A | | 7/1978 | Anderson et al. | |
| 4,118,531 A | | 10/1978 | Hauser | |
| 4,139,699 A | | 2/1979 | Hernandez et al. | |
| 4,203,939 A | | 5/1980 | Drachenberg et al. | |
| 4,243,480 A | | 1/1981 | Hernandez et al. | |
| 4,264,555 A | * | 4/1981 | Lang | D01D 4/02 264/178 F |
| 4,270,289 A | | 6/1981 | Kimura | |
| 4,295,987 A | | 10/1981 | Parks | |
| 4,355,066 A | | 10/1982 | Newman | |
| 4,370,289 A | | 1/1983 | Sorenson | |
| 4,380,570 A | | 4/1983 | Schwarz | |
| 4,436,780 A | | 3/1984 | Hotchkiss et al. | |
| 4,604,313 A | | 8/1986 | Mcfarland et al. | |
| 4,623,576 A | | 11/1986 | Lloyd et al. | |
| 4,634,621 A | | 1/1987 | Manning et al. | |
| 4,636,418 A | | 1/1987 | Kennard et al. | |
| 4,675,226 A | | 6/1987 | Ott | |
| 4,720,415 A | | 1/1988 | Vander | |
| 4,724,114 A | | 2/1988 | Mcfarland et al. | |
| 4,786,550 A | | 11/1988 | Mcfarland et al. | |
| 4,803,117 A | | 2/1989 | Daponte | |
| 4,808,467 A | | 2/1989 | Suskind | |
| 4,851,168 A | | 7/1989 | Graiver et al. | |
| 4,855,179 A | | 8/1989 | Bourland et al. | |
| 4,863,779 A | | 9/1989 | Daponte | |
| 4,879,170 A | | 11/1989 | Radwanski et al. | |
| 4,885,202 A | | 12/1989 | Lloyd et al. | |
| 4,906,513 A | | 3/1990 | Kebbell et al. | |
| 4,923,454 A | | 5/1990 | Seymour | |
| 4,931,201 A | | 6/1990 | Julemont | |
| 4,931,355 A | | 6/1990 | Radwanski et al. | |
| 4,939,016 A | | 7/1990 | Radwanski et al. | |
| 4,950,601 A | | 8/1990 | Macdonald et al. | |
| 4,970,104 A | | 11/1990 | Radwanski | |
| 5,087,506 A | | 2/1992 | Palumbo | |
| 5,094,717 A | | 3/1992 | Manning et al. | |
| 5,120,642 A | | 6/1992 | Schlossman et al. | |
| 5,120,888 A | | 6/1992 | Nohr | |
| 5,144,729 A | | 9/1992 | Austin | |
| 5,145,727 A | | 9/1992 | Potts et al. | |
| 5,149,576 A | | 9/1992 | Potts et al. | |
| 5,160,746 A | | 11/1992 | Dodge, II et al. | |
| 5,204,165 A | | 4/1993 | Schortmann | |
| 5,227,107 A | | 7/1993 | Dickenson et al. | |
| 5,254,133 A | | 10/1993 | Seid | |
| 5,254,399 A | | 10/1993 | Oku et al. | |
| 5,266,255 A | * | 11/1993 | Gibbon | D01D 4/02 425/464 |
| 5,272,236 A | | 12/1993 | Lai et al. | |
| 5,284,703 A | | 2/1994 | Everhart et al. | |
| 5,350,624 A | | 9/1994 | Georger et al. | |
| 5,375,306 A | | 12/1994 | Roussin-moynier | |
| 5,409,768 A | | 4/1995 | Dickenson et al. | |
| 5,427,696 A | | 6/1995 | Phan et al. | |
| 5,436,066 A | | 7/1995 | Chen | |
| 5,476,616 A | | 12/1995 | Schwarz | |
| 5,508,102 A | | 4/1996 | Georger et al. | |
| 5,509,915 A | | 4/1996 | Hanson | |
| 5,536,563 A | | 7/1996 | Shah et al. | |
| 5,539,056 A | | 7/1996 | Yang et al. | |
| 5,587,225 A | | 12/1996 | Griesbach et al. | |
| 5,597,873 A | | 1/1997 | Chambers et al. | |
| 5,603,707 A | | 2/1997 | Trombetta et al. | |
| 5,611,890 A | | 3/1997 | Vinson et al. | |
| 5,629,080 A | | 5/1997 | Gupta et al. | |
| 5,645,057 A | | 7/1997 | Watt et al. | |
| 5,652,048 A | | 7/1997 | Haynes et al. | |
| 5,811,178 A | | 9/1998 | Adam et al. | |
| 5,814,570 A | | 9/1998 | Cohen | |
| 5,834,385 A | | 11/1998 | Blaney et al. | |
| 5,853,867 A | | 12/1998 | Harada et al. | |
| 5,948,710 A | | 9/1999 | Pomplun et al. | |
| 5,952,251 A | | 9/1999 | Jackson et al. | |
| 5,962,112 A | | 10/1999 | Haynes et al. | |
| 6,013,223 A | | 1/2000 | Schwarz | |
| 6,013,349 A | | 1/2000 | Takeuchi et al. | |
| 6,028,018 A | | 2/2000 | Amundson et al. | |
| 6,103,061 A | | 8/2000 | Anderson et al. | |
| 6,110,848 A | | 8/2000 | Bouchette | |
| 6,114,017 A | | 9/2000 | Fabbricante et al. | |
| 6,150,005 A | | 11/2000 | Williams et al. | |
| 6,162,180 A | | 12/2000 | Miesel et al. | |
| 6,172,276 B1 | | 1/2001 | Hetzler et al. | |
| 6,177,370 B1 | | 1/2001 | Skoog et al. | |
| 6,179,325 B1 | | 1/2001 | Igawa | |
| 6,200,120 B1 | | 3/2001 | Fish et al. | |
| 6,296,936 B1 | | 10/2001 | Yahiaoui et al. | |
| 6,319,342 B1 | | 11/2001 | Riddell | |
| 6,348,133 B1 | | 2/2002 | Woodrum | |

(56) References Cited

U.S. PATENT DOCUMENTS

| | | | |
|---|---|---|---|
| 6,348,253 | B1 | 2/2002 | Daley et al. |
| 6,361,784 | B1 | 3/2002 | Brennan |
| 6,383,336 | B1 | 5/2002 | Shannon |
| 6,417,120 | B1 | 7/2002 | Mitchler et al. |
| 6,423,884 | B1 | 7/2002 | Oehmen |
| 6,465,073 | B1 | 10/2002 | Morman |
| 6,488,801 | B1 | 12/2002 | Bodaghi et al. |
| 6,494,974 | B2 | 12/2002 | Riddell |
| 6,503,370 | B2 | 1/2003 | Hollmark et al. |
| 6,506,873 | B1 | 1/2003 | Ryan et al. |
| 6,550,115 | B1 | 4/2003 | Skoog et al. |
| 6,589,892 | B1 | 7/2003 | Smith et al. |
| 6,608,236 | B1 | 8/2003 | Burnes et al. |
| 6,621,679 | B1 | 9/2003 | Segervall |
| 6,638,884 | B2 | 10/2003 | Quick et al. |
| 6,686,303 | B1 | 2/2004 | Haynes et al. |
| 6,709,526 | B1 | 3/2004 | Bailey et al. |
| 6,739,023 | B2 | 5/2004 | Vonfeldt et al. |
| 6,759,356 | B1 | 7/2004 | Myers |
| 6,783,854 | B2 | 8/2004 | Bond |
| 6,797,226 | B2 | 9/2004 | Annable |
| 6,811,638 | B2 | 11/2004 | Close et al. |
| 6,823,568 | B1 | 11/2004 | Kobayashi et al. |
| 6,836,937 | B1 | 1/2005 | Boscolo |
| 6,926,931 | B2 | 8/2005 | Qashou et al. |
| 6,946,413 | B2 | 9/2005 | Lange et al. |
| 6,979,386 | B1 | 12/2005 | Wallajapet et al. |
| 6,986,932 | B2 | 1/2006 | Zink et al. |
| 6,992,028 | B2 | 1/2006 | Thomaschefsky et al. |
| 7,000,000 | B1 | 2/2006 | Obrien |
| 7,028,429 | B1 | 4/2006 | Druliner |
| 7,029,620 | B2 | 4/2006 | Gordon et al. |
| 7,041,369 | B1 | 5/2006 | Mackey et al. |
| 7,176,150 | B2 | 2/2007 | Kopacz et al. |
| 7,208,429 | B2 | 4/2007 | Vinson et al. |
| 7,371,701 | B2 | 5/2008 | Inagaki |
| 7,410,683 | B2 | 8/2008 | Curro et al. |
| 7,425,517 | B2 | 9/2008 | Deka et al. |
| 7,524,379 | B2 | 4/2009 | Bailey et al. |
| 7,601,657 | B2 | 10/2009 | Zhou et al. |
| 7,681,756 | B2 | 3/2010 | Baer et al. |
| 7,696,109 | B2 | 4/2010 | Ouellette et al. |
| 7,879,172 | B2 | 2/2011 | Kopacz et al. |
| 7,902,096 | B2 | 3/2011 | Brandner et al. |
| 7,947,359 | B2 | 5/2011 | Suzuka et al. |
| 7,972,986 | B2 | 7/2011 | Barnholtz et al. |
| 7,976,679 | B2 | 7/2011 | Vinson et al. |
| 7,994,079 | B2 | 8/2011 | Chen et al. |
| 7,994,081 | B2 | 8/2011 | Farell et al. |
| 7,998,889 | B2 | 8/2011 | Stralin et al. |
| 8,017,534 | B2 | 9/2011 | Harvey et al. |
| 8,852,474 | B2 | 10/2014 | Barnholtz et al. |
| 9,714,484 | B2 | 7/2017 | Barnholtz et al. |
| 9,926,648 | B2 | 3/2018 | Barnholtz et al. |
| 10,024,000 | B2 | 7/2018 | Barnholtz et al. |
| 10,513,801 | B2 | 12/2019 | Barnholtz et al. |
| 10,858,785 | B2 | 12/2020 | Barnholtz et al. |
| 11,326,276 | B2 | 5/2022 | Barnholtz et al. |
| 11,346,056 | B2 | 5/2022 | Barnholtz et al. |
| 11,639,581 | B2 | 5/2023 | Barnholtz |
| 2003/0024662 | A1 | 2/2003 | Besemer et al. |
| 2003/0060113 | A1 | 3/2003 | Christie et al. |
| 2003/0073367 | A1 | 4/2003 | Kopacz et al. |
| 2003/0106560 | A1 | 6/2003 | Griesbach et al. |
| 2003/0114066 | A1 | 6/2003 | Clark et al. |
| 2003/0116890 | A1 | 6/2003 | Chambers et al. |
| 2003/0131457 | A1 | 7/2003 | Krautkramer et al. |
| 2003/0135172 | A1 | 7/2003 | Whitmore et al. |
| 2003/0150090 | A1 | 8/2003 | Krautkramer et al. |
| 2003/0200991 | A1 | 10/2003 | Keck |
| 2003/0203196 | A1 | 10/2003 | Trokhan |
| 2003/0211802 | A1 | 11/2003 | Keck et al. |
| 2003/0211862 | A1 | 11/2003 | Hutchison et al. |
| 2003/0220039 | A1 | 11/2003 | Chen et al. |
| 2003/0224686 | A1 | 12/2003 | Andersen |
| 2004/0048542 | A1 | 3/2004 | Thomaschefsky et al. |
| 2004/0065422 | A1 | 4/2004 | Hu et al. |
| 2004/0087237 | A1 | 5/2004 | Garnier et al. |
| 2004/0096656 | A1 | 5/2004 | Bond |
| 2004/0106723 | A1 | 6/2004 | Yang et al. |
| 2004/0116018 | A1 | 6/2004 | Fenwick et al. |
| 2004/0123963 | A1 | 7/2004 | Chen et al. |
| 2004/0137200 | A1 * | 7/2004 | Chhabra ................ D04H 1/558 604/289 |
| 2004/0163781 | A1 | 8/2004 | Hernandez-munoa et al. |
| 2004/0181199 | A1 | 9/2004 | Moberg-alehammar et al. |
| 2005/0020170 | A1 | 1/2005 | Deka et al. |
| 2005/0056956 | A1 | 3/2005 | Zhao et al. |
| 2005/0090175 | A1 | 4/2005 | Bergholm et al. |
| 2005/0103455 | A1 | 5/2005 | Edwards et al. |
| 2005/0112980 | A1 | 5/2005 | Strandqvist et al. |
| 2005/0130536 | A1 | 6/2005 | Siebers et al. |
| 2005/0130544 | A1 | 6/2005 | Cheng et al. |
| 2005/0133177 | A1 | 6/2005 | Stralin et al. |
| 2005/0133971 | A1 | 6/2005 | Haynes et al. |
| 2005/0136765 | A1 | 6/2005 | Shannon |
| 2005/0136772 | A1 | 6/2005 | Chen et al. |
| 2005/0136778 | A1 | 6/2005 | Thomaschefsky et al. |
| 2005/0137540 | A1 | 6/2005 | Villanueva et al. |
| 2005/0148262 | A1 | 7/2005 | Varona et al. |
| 2005/0148264 | A1 | 7/2005 | Varona et al. |
| 2005/0159065 | A1 | 7/2005 | Stralin et al. |
| 2005/0170727 | A1 | 8/2005 | Melik et al. |
| 2005/0170729 | A1 | 8/2005 | Stadelman et al. |
| 2005/0177122 | A1 | 8/2005 | Berba et al. |
| 2005/0245159 | A1 | 11/2005 | Chmielewski et al. |
| 2005/0247416 | A1 | 11/2005 | Forry et al. |
| 2005/0266760 | A1 | 12/2005 | Chhabra et al. |
| 2005/0274470 | A1 | 12/2005 | Shannon et al. |
| 2005/0279470 | A1 | 12/2005 | Redd et al. |
| 2006/0014460 | A1 | 1/2006 | Alexander et al. |
| 2006/0084340 | A1 | 4/2006 | Bond et al. |
| 2006/0086633 | A1 | 4/2006 | Kleinsmith |
| 2006/0088697 | A1 | 4/2006 | Manifold et al. |
| 2006/0134384 | A1 | 6/2006 | Vinson et al. |
| 2006/0141891 | A1 | 6/2006 | Melius et al. |
| 2007/0010153 | A1 | 1/2007 | Shaffer et al. |
| 2007/0039704 | A1 | 2/2007 | Cabell et al. |
| 2007/0049153 | A1 | 3/2007 | Dunbar et al. |
| 2007/0063091 | A1 | 3/2007 | Neveu |
| 2007/0077841 | A1 | 4/2007 | Zoch et al. |
| 2007/0173162 | A1 | 7/2007 | Ethiopia et al. |
| 2007/0202766 | A1 | 8/2007 | Ouellette et al. |
| 2007/0232180 | A1 | 10/2007 | Polat et al. |
| 2007/0269627 | A1 | 11/2007 | Vinson et al. |
| 2007/0272381 | A1 | 11/2007 | Elony et al. |
| 2008/0000602 | A1 | 1/2008 | Dyer et al. |
| 2008/0008853 | A1 | 1/2008 | Hupp et al. |
| 2008/0041543 | A1 | 2/2008 | Dyer |
| 2008/0050996 | A1 | 2/2008 | Stralin et al. |
| 2008/0051471 | A1 | 2/2008 | Kronberg et al. |
| 2008/0142178 | A1 | 6/2008 | Haubrich et al. |
| 2008/0241538 | A1 | 10/2008 | Lee et al. |
| 2008/0248239 | A1 | 10/2008 | Pomeroy et al. |
| 2009/0022960 | A1 | 1/2009 | Suer et al. |
| 2009/0022983 | A1 | 1/2009 | Cabell et al. |
| 2009/0023839 | A1 | 1/2009 | Barnholtz et al. |
| 2009/0084513 | A1 | 4/2009 | Barnholtz et al. |
| 2009/0093585 | A1 | 4/2009 | Smith et al. |
| 2009/0151748 | A1 | 6/2009 | Ridenhour |
| 2009/0220741 | A1 | 9/2009 | Manifold |
| 2009/0220769 | A1 | 9/2009 | Manifold |
| 2010/0048082 | A1 | 2/2010 | Topolkaraev et al. |
| 2010/0239825 | A1 | 9/2010 | Sheehan et al. |
| 2010/0326612 | A1 | 12/2010 | Hupp et al. |
| 2011/0039054 | A1 | 2/2011 | Cabell et al. |
| 2011/0045261 | A1 | 2/2011 | Sellars |
| 2011/0100574 | A1 | 5/2011 | Barnholtz et al. |
| 2011/0104419 | A1 | 5/2011 | Barnholtz et al. |
| 2011/0104444 | A1 | 5/2011 | Barnholtz et al. |
| 2011/0104493 | A1 | 5/2011 | Barnholtz et al. |
| 2011/0104970 | A1 | 5/2011 | Barnholtz et al. |
| 2011/0209840 | A1 | 9/2011 | Barnholtz et al. |
| 2011/0220310 | A1 | 9/2011 | Polat et al. |

(56) References Cited

U.S. PATENT DOCUMENTS

| | | | | |
|---|---|---|---|---|
| 2011/0244199 | A1 | 10/2011 | Brennan et al. | |
| 2012/0318693 | A1 | 12/2012 | Conner et al. | |
| 2018/0305871 | A1 | 10/2018 | Barnholtz et al. | |
| 2019/0136458 | A1 | 5/2019 | Barnholtz et al. | |
| 2019/0242066 | A1 | 8/2019 | Barnholtz et al. | |
| 2020/0102671 | A1 | 4/2020 | Barnholtz et al. | |
| 2022/0325440 | A1 | 10/2022 | Barnholtz et al. | |
| 2022/0364284 | A1* | 11/2022 | Zampollo | D04H 1/56 |
| 2023/0295879 | A1 | 9/2023 | Barnholtz et al. | |

FOREIGN PATENT DOCUMENTS

| | | | |
|---|---|---|---|
| EP | 0156649 | A2 | 10/1985 |
| EP | 0294137 | A1 | 12/1988 |
| EP | 0341977 | A2 | 11/1989 |
| EP | 0333209 | B1 | 6/1994 |
| EP | 0205242 | B2 | 11/1995 |
| EP | 1156147 | A1 | 11/2001 |
| EP | 1156160 | A2 | 11/2001 |
| EP | 1887036 | A2 | 2/2008 |
| EP | 2028296 | A1 | 2/2009 |
| GB | 2113731 | A | 8/1983 |
| JP | 59211667 | A | 11/1984 |
| JP | 2000303335 | A2 | 10/2000 |
| JP | 2002088660 | A | 3/2002 |
| JP | 2004141255 | A | 5/2004 |
| JP | 2004348984 | A | 12/2004 |
| JP | 2005218525 | A2 | 8/2005 |
| JP | 2008174735 | A | 7/2008 |
| WO | 9419179 | A1 | 9/1994 |
| WO | 9855295 | A1 | 12/1998 |
| WO | 0011998 | A1 | 3/2000 |
| WO | 0029655 | A1 | 5/2000 |
| WO | 0029658 | A1 | 5/2000 |
| WO | 0063486 | A1 | 10/2000 |
| WO | 0109023 | A1 | 2/2001 |
| WO | 0166345 | A1 | 9/2001 |
| WO | 03050347 | A1 | 6/2003 |
| WO | 03080905 | A1 | 10/2003 |
| WO | 2004098474 | A1 | 11/2004 |
| WO | 2005073446 | A1 | 8/2005 |
| WO | 2005080497 | A1 | 9/2005 |
| WO | 2005106085 | A1 | 11/2005 |
| WO | 2005118934 | A1 | 12/2005 |
| WO | 2006027810 | A1 | 3/2006 |
| WO | 2007070064 | A1 | 6/2007 |
| WO | 2007070075 | A1 | 6/2007 |
| WO | 2007078344 | A1 | 7/2007 |
| WO | 2007098449 | A1 | 8/2007 |
| WO | 2007100936 | A2 | 9/2007 |
| WO | 2007124866 | A1 | 11/2007 |
| WO | 2007135624 | A2 | 11/2007 |
| WO | 2008005500 | A2 | 1/2008 |
| WO | 2008050311 | A2 | 5/2008 |
| WO | 2009010940 | A2 | 1/2009 |
| WO | 2009010941 | A2 | 1/2009 |
| WO | 2009010942 | A2 | 1/2009 |

OTHER PUBLICATIONS

All Office Actions, U.S. Appl. No. 13/106,302, filed May 12, 2011.
All Office Actions, U.S. Appl. No. 16/237,950, filed Jan. 2, 2019.
All Office Actions, U.S. Appl. No. 16/237,943, filed Jan. 2, 2019.
All Office Actions, U.S. Appl. No. 16/702,920, filed Dec. 4, 2019.
All Office Actions; U.S. Appl. No. 12/170,578, filed Jul. 10, 2008.
All Office Actions; U.S. Appl. No. 12/170,575, filed Jul. 10, 2008.
All Office Actions; U.S. Appl. No. 14/475,699, filed Sep. 3, 2014.
All Office Actions; U.S. Appl. No. 15/891,726, filed Feb. 8, 2018.
All Office Actions; U.S. Appl. No. 16/022,749, filed Jun. 29, 2018.
All Office Actions; U.S. Appl. No. 17/729,323, filed Apr. 26, 2022.
All Office Actions; U.S. Appl. No. 18/190,535, filed Mar. 27, 2023.
Anonymous, "NanoDispense® Contact Angle Measurements", First TenAngstroms, (Oct. 3, 2004). Retrieved from the Internet: URL:http://www.firsttenangstroms.com/pdf docs/N anoDispenseExamples. pdf, (retrieved Feb. 15, 2011). Entire document.
Behnam Pourdeyhimi, ITMA 2007 Review: Implications for the "Nonwovens Industry", North Carolina State University, Journal of Engineered Fibers and Fabrics, vol. 3, Issue 1—2008 Special Bulletin,URL Link :http://www.jeffjournal.org, 2008, 10 pages.
Complete Textile Glossary, Celaneses Acetate (2001), definition of "filament".
CV of Dr. Gajanan S. Bhat, Georgia Athletic Association Professor of Fibers and Textiles, Fitesa/Exhibit 1021, No Known date, 21 pages.
Declaration of Gajanan S, Bhat, Ph.D, U.S. Pat. No. 10,513,801 Fitesa/Exhibit 1015, No Known Date, 139 pages.
Declaration of Gajanan S, Bhat, Ph.D, U.S. Pat. No. 11,326,276, Fitesa/Exhibit 1015, No Known Date, 149 pages.
G. S. Bhat et al., Polymer-laid web Formation, Handbook ofNonwovens, edited by S.J. Russel, Woodhead PublishingLimited, dated Dec. 2007, pp. 143-200.
10859 PCT Search Report and Written Opinion for PCT/1B2008/052889 dated Jan. 22, 2009, 17 pages.
John G. McCulloch, The History of the Development of MeltBlowing Technology, International Nonwovens Journal, Fitesa/Exhibit 1010, dated Mar. 1999, 11 pages.
Meyer, et al., "Comparison between different presentations of pore size distributionin porous materials." Fresenius J. Anal Chem., 1999, pp. 174-178.
Miller, Bernard, "Liquid Porosimetry: New Methodology and Applications"Journal of Colloid and Interface Science, Aug. 23, 1993, pp. 163-170.
Randall R. Bresee et al., Influence of Processing Conditions on Melt Blown Web Structure: Part 1—DCD, Department of Materials Science & Engineering, The University of Tennessee, Fitesa/Exhibit 1025, INJ Spring, 2004, 07 pages.
Randall R. Bresee et al., Influence of Processing Conditions on Melt Blown Web Structure: Part 2—Primary Airflow Rate, Department of Materials Science & Engineering, The University of Tennessee, Fitesa/Exhibit 1026, INJ Summer, 2005, 08 pages.
Ron (Rongguo) Zhao, Melt Blown Dies: A Hot Innovation Spot, Textiles and Nonwovens Development Center, University of Tennessee, INJ Winter 2002, Fitesa/Exhibit 1011,2002, 05 pages.
Youngchul Lee et al., Effects of melt-blowing process conditions on morphological and mechanical properties of polypropylene webs, Textile Materials Research Laboratory, Center for Materials Processing, University of Tennessee, Fitesa/Exhibit 1027, Polymer, vol. 33, No. 6, 1992, 10 pages.

* cited by examiner

PROCESS FOR MAKING FIBROUS STRUCTURES

CROSS-REFERENCE TO RELATED APPLICATIONS

This Application is a Continuation of Ser. No. 17/729,323 filed 2022 Apr. 26; U.S. Pat. No. 12,258,684 Issue Date 2025 Mar. 25

Ser. No. 17/729,323 is a Continuation of Ser. No. 16/702,920 filed 2019 Dec. 4; U.S. Pat. No. 11,326,276 Issue Date 2022 May 10;

Ser. No. 16/702,920 is a Continuation of Ser. No. 15/891,726 filed 2018 Feb. 8; U.S. Pat. No. 10,513,801 Issue Date 2019 Dec. 24;

Ser. No. 15/891,726 is a Continuation of Ser. No. 14/475,699 filed 2014 Sep. 3; U.S. Pat. No. 9,926,648 Issue Date 2018 Mar. 27;

Ser. No. 14/475,699 is a Continuation of Ser. No. 12/170,575 filed 2008 Jul. 10; U.S. Pat. No. 8,852,474 Issue Date 2014 Oct. 7;

Ser. No. 12/170,575 Claims benefit of Provisional 60/959,885 filed 2007 Jul. 17.

FIELD OF THE INVENTION

The present invention relates to processes for making fibrous structures and more particularly to processes for making fibrous structures comprising filaments.

BACKGROUND OF THE INVENTION

Processes for making fibrous structures comprising filaments are known in the art. An example of such a known process is a co-form process.

Known co-form processes utilize a knife-edge die that comprises filament-forming holes. The filaments produced by the filament-forming holes are contacted after exiting by air. The air contacts the filaments at an angle of 30° to less than 90°, not parallel to or substantially parallel to the filament produced from the filament-forming holes.

The problem with current processes for making fibrous structures, especially processes that utilize knife-edge dies, is that the fibrous structures comprise filaments having a distribution of average filament diameters that does not optimize the properties, for example absorbency properties (such as absorption capacity and/or rate of absorption) of the fibrous structures.

Accordingly, there is a need for a process for making fibrous structures, especially fibrous structure that comprise filaments, that provide improved properties compared to fibrous structures produced by known processes for making fibrous structures, especially processes that utilize knife-edge dies.

SUMMARY OF THE INVENTION

The present invention solves the problem identified above by providing a process for making fibrous structures, especially fibrous structure that comprise filaments, that exhibit improved properties compared to fibrous structure produced by known processes for making fibrous structures, especially processes that utilize knife-edge dies.

In one example of the present invention, a process for making a fibrous structure, the process comprising the steps of:

a. providing a die comprising one or more filament-forming holes, wherein one or more fluid-releasing holes are associated with one filament-forming hole such that a fluid exiting the fluid-releasing hole is parallel or substantially parallel to an exterior surface of a filament exiting the filament-forming hole;
b. supplying at least a first polymer to the die;
c. producing a plurality of filaments comprising the first polymer from the die;
d. combining the filaments with solid additives to form a mixture; and
e. collecting the mixture on a collection device to produce a fibrous structure; is provided.

In another example of the present invention, a process for making a fibrous structure, the process comprising the steps of:

a. providing a die comprising one or more filament-forming holes, wherein one or more fluid-releasing holes are associated with one filament-forming hole such that a fluid exiting the fluid-releasing hole is parallel or substantially parallel to an exterior surface of a filament exiting the filament-forming hole;
b. supplying a polyolefin polymer to the die;
c. producing a plurality of filaments comprising the polyolefin polymer from the die;
d. combining the filaments with wood pulp fibers to form a mixture; and
e. collecting the mixture on a collection device to produce a fibrous structure; is provided.

In yet another example of the present invention, a fibrous structure made by a process according to the present invention is provided.

Accordingly, the present invention provides a process for making fibrous structures, especially fibrous structure that comprise filaments, that exhibit improved properties compared to fibrous structure produced by known processes for making fibrous structures, especially processes that utilize knife-edge dies.

DETAILED DESCRIPTION OF THE INVENTION

Definitions

Figure 1:
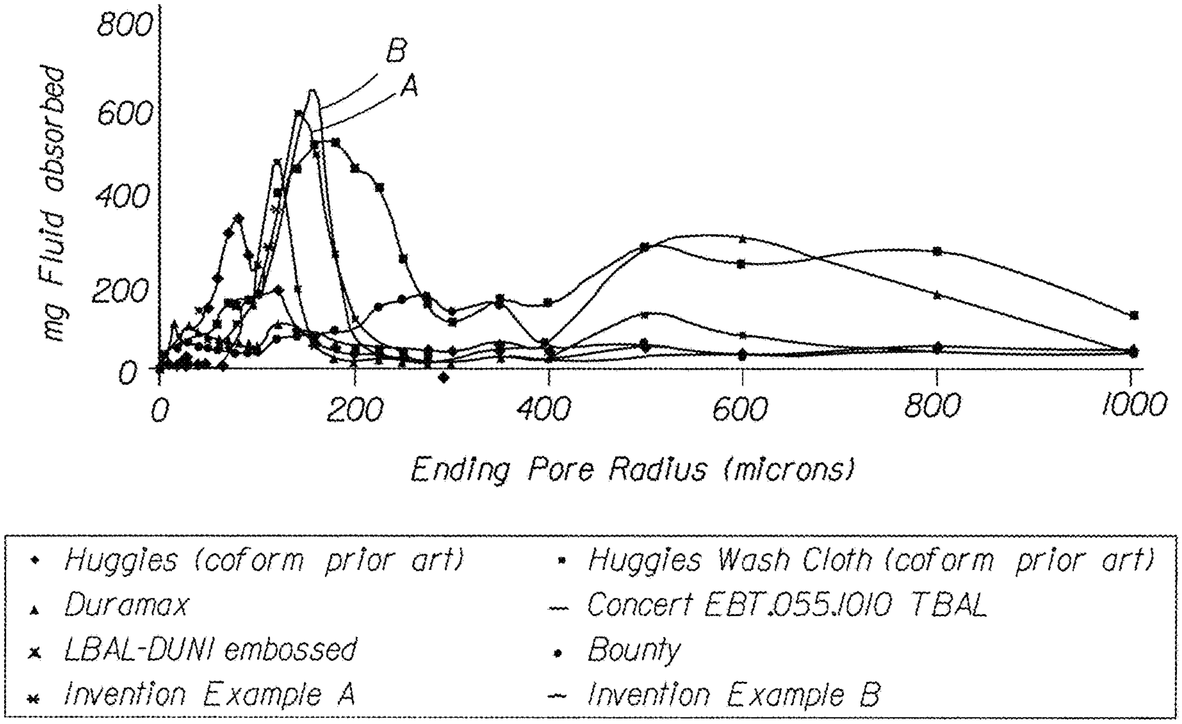
FIG. 1 is a Pore Volume Distribution graph of various fibrous structures, including a fibrous structure according to the present invention, showing the Ending Pore Radius of from 1 μm to 1000 μm and the Capacity of Water in Pores.

"Fibrous structure" as used herein means a structure that comprises one or more filaments and/or fibers. In one example, a fibrous structure according to the present invention means an orderly arrangement of filaments and/or fibers within a structure in order to perform a function. Nonlimiting examples of fibrous structures of the present invention include paper, fabrics (including woven, knitted, and nonwoven), and absorbent pads (for example for diapers or feminine hygiene products).

Nonlimiting examples of processes for making fibrous structures include known wet-laid papermaking processes and air-laid papermaking processes. Such processes typically include steps of preparing a fiber composition in the form of a suspension in a medium, either wet, more specifically aqueous medium, or dry, more specifically gaseous, i.e. with air as medium. The aqueous medium used for wet-laid processes is oftentimes referred to as a fiber slurry. The fibrous slurry is then used to deposit a plurality of fibers onto a forming wire or belt such that an embryonic fibrous structure is formed, after which drying and/or bonding the fibers together results in a fibrous structure. Further processing the fibrous structure may be carried out such that a finished fibrous structure is formed. For example, in typical papermaking processes, the finished fibrous structure is the fibrous structure that is wound on the reel at the end of papermaking, and may subsequently be converted into a finished product, e.g. a sanitary tissue product.

The fibrous structures of the present invention may be homogeneous or may be layered. If layered, the fibrous structures may comprise at least two and/or at least three and/or at least four and/or at least five layers.

The fibrous structures of the present invention may be co-formed fibrous structures.

"Co-formed fibrous structure" as used herein means that the fibrous structure comprises a mixture of at least two different materials wherein at least one of the materials comprises a filament, such as a polypropylene filament, and at least one other material, different from the first material, comprises a solid additive, such as a fiber and/or a particulate. In one example, a co-formed fibrous structure comprises solid additives, such as fibers, such as wood pulp fibers, and filaments, such as polypropylene filaments.

"Solid additive" as used herein means a fiber and/or a particulate.

"Particulate" as used herein means a granular substance or powder.

"Fiber" and/or "Filament" as used herein means an elongate particulate having an apparent length greatly exceeding its apparent width, i.e. a length to diameter ratio of at least about 10. For purposes of the present invention, a "fiber" is an elongate particulate as described above that exhibits a length of less than 5.08 cm (2 in.) and a "filament" is an elongate particulate as described above that exhibits a length of greater than or equal to 5.08 cm (2 in.).

Fibers are typically considered discontinuous in nature. Nonlimiting examples of fibers include wood pulp fibers and synthetic staple fibers such as polyester fibers.

Filaments are typically considered continuous or substantially continuous in nature. Filaments are relatively longer than fibers. Nonlimiting examples of filaments include meltblown and/or spunbond filaments. Nonlimiting examples of materials that can be spun into filaments include natural polymers, such as starch, starch derivatives, cellulose and cellulose derivatives, hemicellulose, hemicellulose derivatives, and synthetic polymers including, but not limited to polyvinyl alcohol filaments and/or polyvinyl alcohol derivative filaments, and thermoplastic polymer filaments, such as polyesters, nylons, polyolefins such as polypropylene filaments, polyethylene filaments, and biodegradable or compostable thermoplastic fibers such as polylactic acid filaments, polyhydroxyalkanoate filaments and polycaprolactone filaments. The filaments may be monocomponent or multicomponent, such as bicomponent filaments.

In one example of the present invention, "fiber" refers to papermaking fibers. Papermaking fibers useful in the present invention include cellulosic fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred since they impart a superior tactile sense of softness to tissue sheets made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified web. U.S. Pat. Nos. 4,300,981 and 3,994,771 are incorporated herein by reference for the purpose of disclosing layering of hardwood and softwood fibers. Also applicable to the present invention are fibers derived from recycled paper, which may contain any or all of the above categories as well as other non-fibrous materials such as fillers and adhesives used to facilitate the original papermaking.

In addition to the various wood pulp fibers, other cellulosic fibers such as cotton linters, rayon, lyocell and bagasse can be used in this invention. Other sources of cellulose in the form of fibers or capable of being spun into fibers include grasses and grain sources.

"Sanitary tissue product" as used herein means a soft, low density (i.e. <about 0.15 g/cm3) web useful as a wiping implement for post-urinary and post-bowel movement cleaning (toilet tissue), for otorhinolaryngological discharges (facial tissue), and multi-functional absorbent and cleaning uses (absorbent towels). The sanitary tissue product may be convolutedly wound upon itself about a core or without a core to form a sanitary tissue product roll.

In one example, the sanitary tissue product of the present invention comprises a fibrous structure according to the present invention.

The sanitary tissue products of the present invention may exhibit a basis weight between about 10 g/m$^2$ to about 120 g/m$^2$ and/or from about 15 g/m$^2$ to about 110 g/m$^2$ and/or from about 20 g/m$^2$ to about 100 g/m$^2$ and/or from about 30 to 90 g/m$^2$. In addition, the sanitary tissue product of the present invention may exhibit a basis weight between about 40 g/m$^2$ to about 120 g/m$^2$ and/or from about 50 g/m$^2$ to about 110 g/m$^2$ and/or from about 55 g/m$^2$ to about 105 g/m$^2$ and/or from about 60 to 100 g/m$^2$.

The sanitary tissue products of the present invention may exhibit a total dry tensile strength of greater than about 59 g/cm (150 g/in) and/or from about 78 g/cm (200 g/in) to about 394 g/cm (1000 g/in) and/or from about 98 g/cm (250 g/in) to about 335 g/cm (850 g/in). In addition, the sanitary tissue product of the present invention may exhibit a total dry tensile strength of greater than about 196 g/cm (500 g/in) and/or from about 196 g/cm (500 g/in) to about 394 g/cm (1000 g/in) and/or from about 216 g/cm (550 g/in) to about 335 g/cm (850 g/in) and/or from about 236 g/cm (600 g/in) to about 315 g/cm (800 g/in). In one example, the sanitary tissue product exhibits a total dry tensile strength of less than about 394 g/cm (1000 g/in) and/or less than about 335 g/cm (850 g/in).

In another example, the sanitary tissue products of the present invention may exhibit a total dry tensile strength of greater than about 196 g/cm (500 g/in) and/or greater than about 236 g/cm (600 g/in) and/or greater than about 276 g/cm (700 g/in) and/or greater than about 315 g/cm (800 g/in) and/or greater than about 354 g/cm (900 g/in) and/or greater than about 394 g/cm (1000 g/in) and/or from about 315 g/cm (800 g/in) to about 1968 g/cm (5000 g/in) and/or from about 354 g/cm (900 g/in) to about 1181 g/cm (3000 g/in) and/or from about 354 g/cm (900 g/in) to about 984 g/cm (2500 g/in) and/or from about 394 g/cm (1000 g/in) to about 787 g/cm (2000 g/in).

The sanitary tissue products of the present invention may exhibit an initial total wet tensile strength of less than about 78 g/cm (200 g/in) and/or less than about 59 g/cm (150 g/in) and/or less than about 39 g/cm (100 g/in) and/or less than about 29 g/cm (75 g/in).

The sanitary tissue products of the present invention may exhibit an initial total wet tensile strength of greater than about 118 g/cm (300 g/in) and/or greater than about 157 g/cm (400 g/in) and/or greater than about 196 g/cm (500 g/in) and/or greater than about 236 g/cm (600 g/in) and/or greater than about 276 g/cm (700 g/in) and/or greater than about 315 g/cm (800 g/in) and/or greater than about 354 g/cm (900 g/in) and/or greater than about 394 g/cm (1000 g/in) and/or from about 118 g/cm (300 g/in) to about 1968 g/cm (5000 g/in) and/or from about 157 g/cm (400 g/in) to about 1181 g/cm (3000 g/in) and/or from about 196 g/cm (500 g/in) to about 984 g/cm (2500 g/in) and/or from about 196 g/cm (500 g/in) to about 787 g/cm (2000 g/in) and/or from about 196 g/cm (500 g/in) to about 591 g/cm (1500 g/in).

The sanitary tissue products of the present invention may exhibit a density (measured at 95 g/in$^2$) of less than about 0.60 g/cm$^3$ and/or less than about 0.30 g/cm$^3$ and/or less than about 0.20 g/cm$^3$ and/or less than about 0.10 g/cm$^3$ and/or less than about 0.07 g/cm$^3$ and/or less than about 0.05 g/cm$^3$ and/or from about 0.01 g/cm$^3$ to about 0.20 g/cm$^3$ and/or from about 0.02 g/cm$^3$ to about 0.10 g/cm$^3$.

The sanitary tissue products of the present invention may exhibit a total absorptive capacity of according to the Horizontal Full Sheet (HFS) Test Method described herein of greater than about 10 g/g and/or greater than about 12 g/g and/or greater than about 15 g/g and/or from about 15 g/g to about 50 g/g and/or to about 40 g/g and/or to about 30 g/g.

The sanitary tissue products of the present invention may exhibit a Vertical Full Sheet (VFS) value as determined by the Vertical Full Sheet (VFS) Test Method described herein of greater than about 5 g/g and/or greater than about 7 g/g and/or greater than about 9 g/g and/or from about 9 g/g to about 30 g/g and/or to about 25 g/g and/or to about 20 g/g and/or to about 17 g/g.

The sanitary tissue products of the present invention may be in the form of sanitary tissue product rolls. Such sanitary tissue product rolls may comprise a plurality of connected, but perforated sheets of fibrous structure, that are separably dispensable from adjacent sheets. In one example, one or more ends of the roll of sanitary tissue product may comprise an adhesive and/or dry strength agent to mitigate the loss of fibers, especially wood pulp fibers from the ends of the roll of sanitary tissue product.

The sanitary tissue products of the present invention may comprises additives such as softening agents, temporary wet strength agents, permanent wet strength agents, bulk softening agents, lotions, silicones, wetting agents, latexes, especially surface-pattern-applied latexes, dry strength agents such as carboxymethylcellulose and starch, and other types of additives suitable for inclusion in and/or on sanitary tissue products.

"Weight average molecular weight" as used herein means the weight average molecular weight as determined using gel permeation chromatography according to the protocol found in Colloids and Surfaces A. Physico Chemical & Engineering Aspects, Vol. 162, 2000, pg. 107-121.

"Basis Weight" as used herein is the weight per unit area of a sample reported in lbs/3000 ft$^2$ or g/m$^2$.

"Machine Direction" or "MD" as used herein means the direction parallel to the flow of the fibrous structure through the fibrous structure making machine and/or sanitary tissue product manufacturing equipment.

"Cross Machine Direction" or "CD" as used herein means the direction parallel to the width of the fibrous structure making machine and/or sanitary tissue product manufacturing equipment and perpendicular to the machine direction.

"Ply" as used herein means an individual, integral fibrous structure.

"Plies" as used herein means two or more individual, integral fibrous structures disposed in a substantially contiguous, face-to-face relationship with one another, forming a multi-ply fibrous structure and/or multi-ply sanitary tissue product. It is also contemplated that an individual, integral fibrous structure can effectively form a multi-ply fibrous structure, for example, by being folded on itself.

"Total Pore Volume" as used herein means the sum of the fluid holding void volume in each pore range from 1 μm to 1000 μm radii as measured according to the Pore Volume Test Method described herein.

"Pore Volume Distribution" as used herein means the distribution of fluid holding void volume as a function of pore radius. The Pore Volume Distribution of a fibrous structure is measured according to the Pore Volume Test Method described herein.

As used herein, the articles "a" and "an" when used herein, for example, "an anionic surfactant" or "a fiber" is understood to mean one or more of the material that is claimed or described.

All percentages and ratios are calculated by weight unless otherwise indicated. All percentages and ratios are calculated based on the total composition unless otherwise indicated.

Unless otherwise noted, all component or composition levels are in reference to the active level of that component or composition, and are exclusive of impurities, for example, residual solvents or by-products, which may be present in commercially available sources.

Fibrous Structure

It has surprisingly been found that the fibrous structures of the present invention exhibit a pore volume distribution unlike pore volume distributions of other known fibrous structures.

The fibrous structures of the present invention may comprise a plurality of filaments, a plurality of solid additives, such as fibers, and a mixture of filaments and solid additives.

Figure 2:
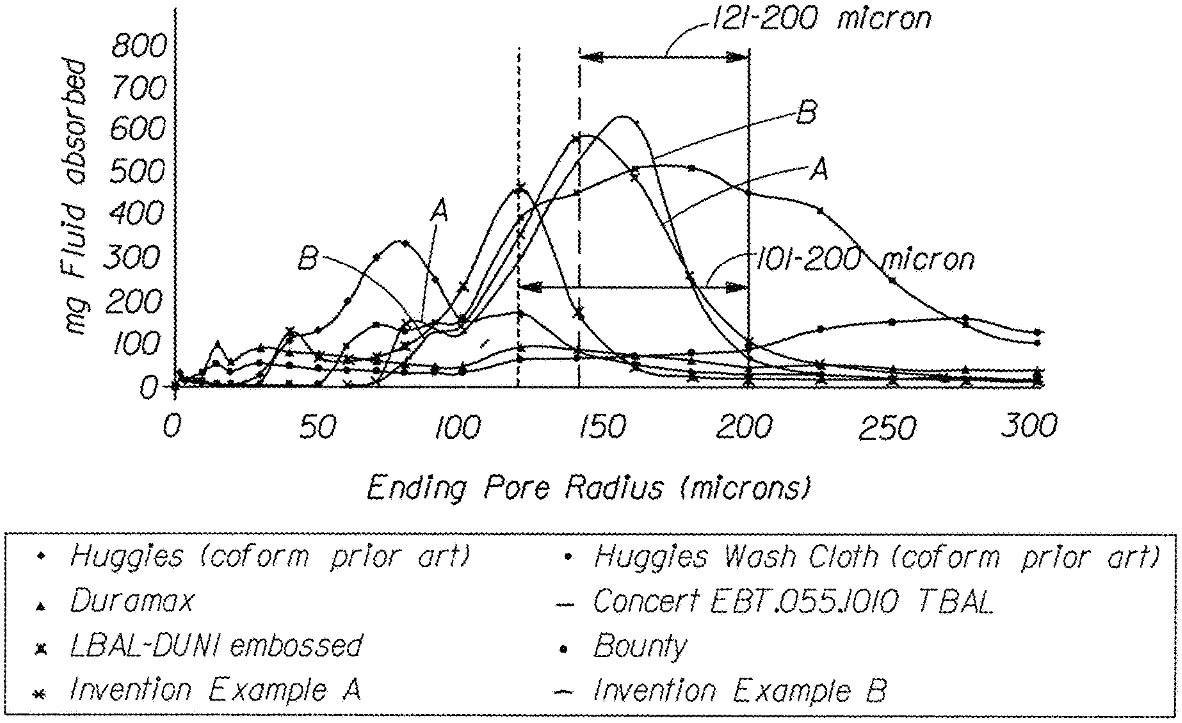
FIG. 2 is a Pore Volume Distribution graph of various fibrous structures, including a fibrous structure according to the present invention, showing the Ending Pore Radius of from 1 μm to 300 μm and the Capacity of Water in Pores.

As shown in FIGS. 1 and 2, examples of fibrous structures according to the present invention as represented by plots A and B exhibit a pore volume distribution such that greater than about 40% of the total pore volume present in the fibrous structure exists in pores of radii of from about 121 μm to about 200 μm and/or greater than about 50% of the total pore volume present in the fibrous structure exists in pores of radii of from about 101 μm to about 200 μm.

The ranges of 101 μm to 200 μm and 121 μm to 200 μm are explicitly identified on the graph of FIG. 2. It should be noted that the value for the ending pore radius for the range of 101 μm to 120 μm is plotted at the ending pore radius; namely, 120 μm. A similar result is shown on FIG. 2 for the value for the ending pore radius for the range of 121 μm to 140 μm, where the value is plotted at the ending pore radius; namely, 140 μm. This data is also supported by the values present in Table 1 below.

Such fibrous structures have been found to exhibit consumer-recognizable beneficial absorbent capacity. In one example, the fibrous structures comprise a plurality of solid additives, for example fibers. In another example, the fibrous structures comprise a plurality of filaments. In yet another example, the fibrous structures comprise a mixture of filaments and solid additives, such as fibers.

As shown in FIG. 2, the examples of fibrous structures according to the present invention as represented by plots A and B may exhibit a bi-modal pore volume distribution such that the fibrous structure exhibits a pore volume distribution such that the greater than about 40% of the total pore volume present in the fibrous structure exists in pores of radii of from about 121 μm to about 200 μm and greater than about 2% and/or greater than about 5% and/or greater than about 10% of the total pore volume present in the fibrous structure exists in pores of radii of less than about 100 μm and/or less than about 80 μm and/or less than about 50 μm and/or from about 1 μm to about 100 μm and/or from about 5 μm to about 75 μm and/or 10 μm to about 50 μm.

A fibrous structure according to the present invention exhibiting a bi-modal pore volume distribution as described above provides beneficial absorbent capacity and absorbent rate as a result of the larger radii pores and beneficial surface drying as a result of the smaller radii pores.

Figure 3:
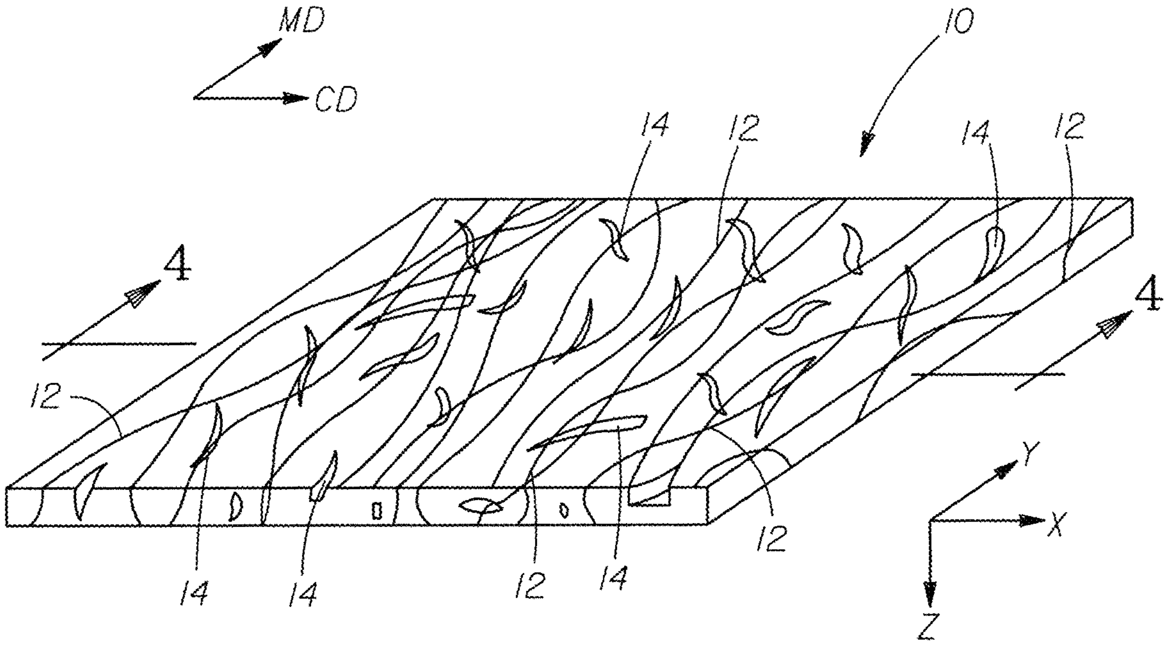
FIG. 3 is a schematic representation of an example of a fibrous structure according to the present invention.
Figure 4:
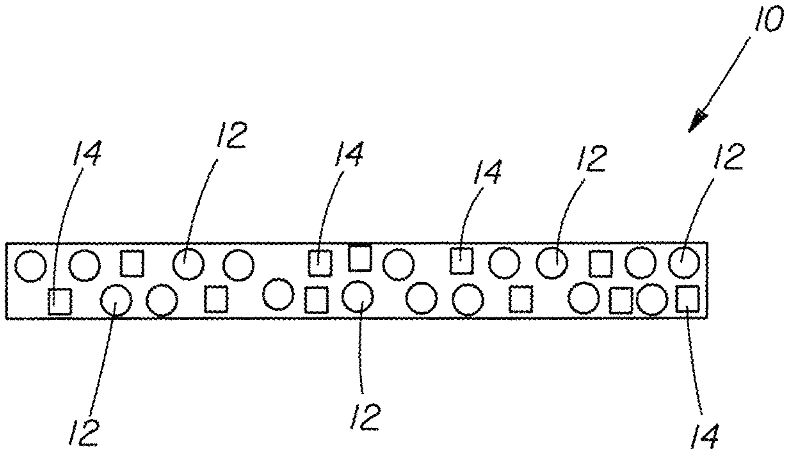
FIG. 4 is a schematic, cross-sectional representation of FIG. 3 taken along line 4-4.

FIGS. 3 and 4 show schematic representations of an example of a fibrous structure in accordance with the present invention. As shown in FIGS. 3 and 4, the fibrous structure 10 may be a co-formed fibrous structure. The fibrous structure 10 comprises a plurality of filaments 12, such as polypropylene fibers, and a plurality of solid additives, such as wood pulp fibers 14. The filaments 12 may be randomly arranged as a result of the process by which they are spun and/or formed into the fibrous structure 10. The wood pulp fibers 14, may be randomly dispersed throughout the fibrous structure 10 in the x-y plane. The wood pulp fibers 14 may be non-randomly dispersed throughout the fibrous structure in the z-direction. In one example (not shown), the wood pulp fibers 14 are present at a higher concentration on one or more of the exterior, x-y plane surfaces than within the fibrous structure along the z-direction.

Figure 5:
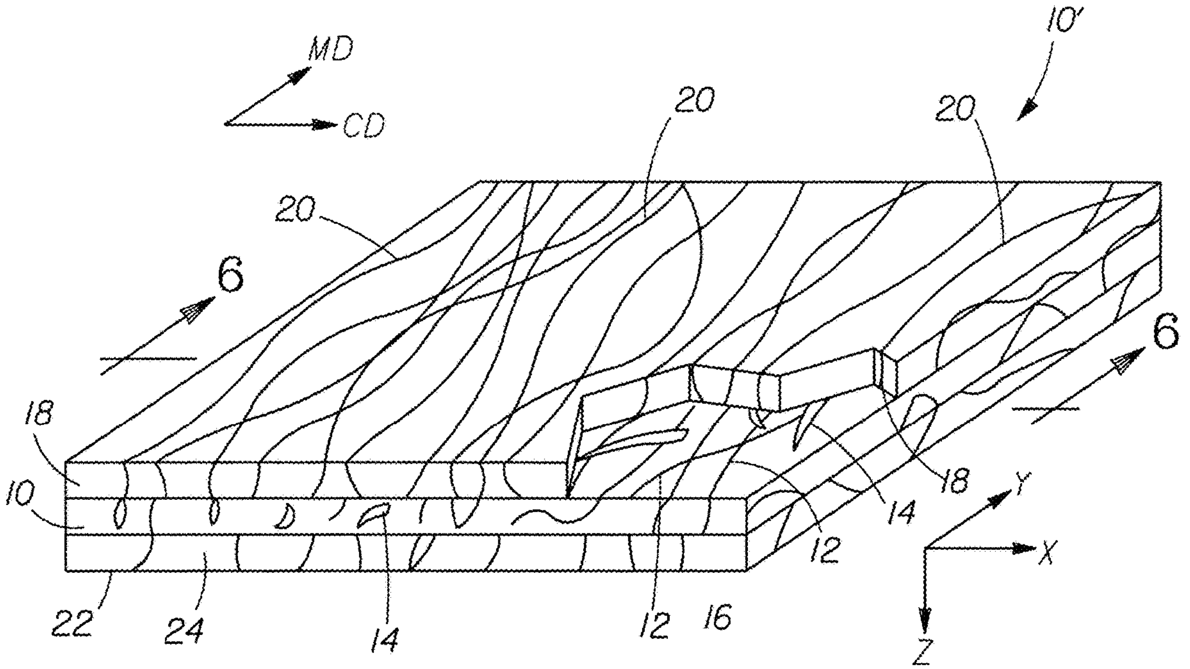
FIG. 5 is a schematic representation of another example of a fibrous structure according to the present invention.

As shown in FIG. 5, another example of a fibrous structure in accordance with the present invention is a layered fibrous structure 10'. The layered fibrous structure 10' comprises a first layer 16 comprising a plurality of filaments 12, such as polypropylene filaments, and a plurality of solid additives, in this example wood pulp fibers 14. The layered fibrous structure 10' further comprises a second layer 18 comprising a plurality of filaments 20, such as polypropylene filaments. In one example, the first and second layers 16, 18, respectively, are sharply defined zones of concentration of the filaments and/or solid additives. The plurality of filaments 20 may be deposited directly onto a surface of the first layer 16 to form a layered fibrous structure that comprises the first and second layers 16, 18, respectively.

Further, the layered fibrous structure 10' may comprise a third layer 22, as shown in FIG. 5. The third layer 22 may comprise a plurality of filaments 24, which may be the same or different from the filaments 20 in the second and/or first layers 18, 16. As a result of the addition of the third layer 22, the first layer 16 is positioned, for example sandwiched, between the second layer 18 and the third layer 22. The plurality of filaments 24 may be deposited directly onto a surface of the first layer 16, opposite from the second layer, to form the layered fibrous structure 10' that comprises the first, second and third layers 16, 18, 22, respectively.

Figure 6:
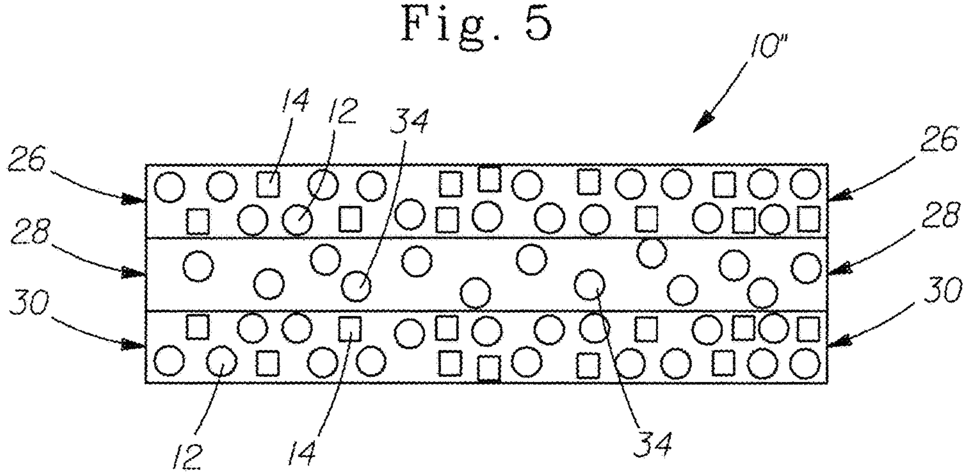
FIG. 6 is a schematic, cross-sectional representation of another example of a fibrous structure according to the present invention.

As shown in FIG. 6, a cross-sectional schematic representation of another example of a fibrous structure in accordance with the present invention comprising a layered fibrous structure 10" is provided. The layered fibrous structure 10" comprises a first layer 26, a second layer 28 and optionally a third layer 30. The first layer 26 comprises a plurality of filaments 12, such as polypropylene filaments, and a plurality of solid additives, such as wood pulp fibers 14. The second layer 28 may comprise any suitable filaments, solid additives and/or polymeric films. In one example, the second layer 28 comprises a plurality of filaments 34. In one example, the filaments 34 comprise a polymer selected from the group consisting of: polysaccharides, polysaccharide derivatives, polyvinylalcohol, polyvinylalcohol derivatives and mixtures thereof.

In another example of a fibrous structure in accordance with the present invention, instead of being layers of fibrous structure 10", the material forming layers 26, 28 and 30, may be in the form of plies wherein two or more of the plies may be combined to form a fibrous structure. The plies may be bonded together, such as by thermal bonding and/or adhesive bonding, to form a multi-ply fibrous structure.

Figure 7:
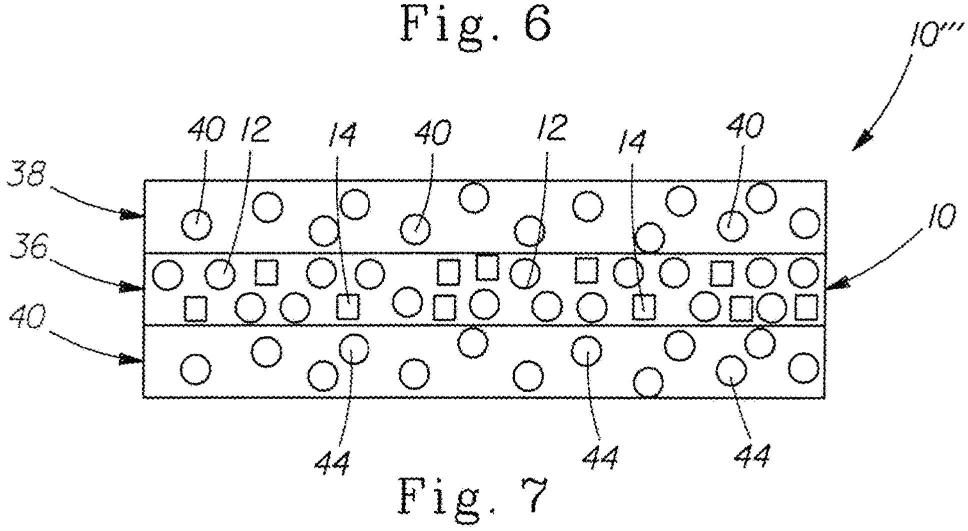
FIG. 7 is a schematic, cross-sectional representation of another example of a fibrous structure according to the present invention.

Another example of a fibrous structure of the present invention in accordance with the present invention is shown in FIG. 7. The fibrous structure 10''' may comprise two or more plies, wherein one ply 36 comprises any suitable fibrous structure in accordance with the present invention, for example fibrous structure 10 as shown and described in FIGS. 3 and 4 and another ply 38 comprising any suitable fibrous structure, for example a fibrous structure comprising filaments 40, such as polypropylene filaments. The fibrous structure of ply 38 may be in the form of a net and/or mesh and/or other structure that comprises pores that expose one or more portions of the fibrous structure 10 to an external environment and/or at least to liquids that may come into contact, at least initially, with the fibrous structure of ply 38. In addition to ply 38, the fibrous structure 10''' may further comprise ply 42. Ply 42 may comprise a fibrous structure comprising filaments 44, such as polypropylene filaments, and may be the same or different from the fibrous structure of ply 38.

Two or more of the plies 36, 38 and 42 may be bonded together, such as by thermal bonding and/or adhesive bonding, to form a multi-ply fibrous structure. After a bonding operation, especially a thermal bonding operation, it may be difficult to distinguish the plies of the fibrous structure 10''' and the fibrous structure 10''' may visually and/or physically be a similar to a layered fibrous structure in that one would have difficulty separating the once individual plies from each other. In one example, ply 36 may comprise a fibrous structure that exhibits a basis weight of at least about 15 $g/m^2$ and/or at least about 20 $g/m^2$ and/or at least about 25 $g/m^2$ and/or at least about 30 $g/m^2$ up to about 120 $g/m^2$ and/or 100 $g/m^2$ and/or 80 $g/m^2$ and/or 60 $g/m^2$ and the plies 38 and 42, when present, independently and individually, may comprise fibrous structures that exhibit basis weights of less than about 10 $g/m^2$ and/or less than about 7 $g/m^2$ and/or less than about 5 $g/m^2$ and/or less than about 3 $g/m^2$ and/or less than about 2 $g/m^2$ and/or to about 0 $g/m^2$ and/or 0.5 $g/m^2$.

Plies 38 and 42, when present, may help retain the solid additives, in this case the wood pulp fibers 14, on and/or within the fibrous structure of ply 36 thus reducing lint and/or dust (as compared to a single-ply fibrous structure comprising the fibrous structure of ply 36 without the plies 38 and 42) resulting from the wood pulp fibers 14 becoming free from the fibrous structure of ply 36.

The fibrous structures of the present invention may comprise any suitable amount of filaments and any suitable amount of solid additives. For example, the fibrous structures may comprise from about 10% to about 70% and/or from about 20% to about 60% and/or from about 30% to about 50% by dry weight of the fibrous structure of filaments and from about 90% to about 30% and/or from about 80% to about 40% and/or from about 70% to about 50% by dry weight of the fibrous structure of solid additives, such as wood pulp fibers.

The filaments and solid additives of the present invention may be present in fibrous structures according to the present invention at weight ratios of filaments to solid additives of from at least about 1:1 and/or at least about 1:1.5 and/or at least about 1:2 and/or at least about 1:2.5 and/or at least about 1:3 and/or at least about 1:4 and/or at least about 1:5 and/or at least about 1:7 and/or at least about 1:10.

The fibrous structures of the present invention and/or any sanitary tissue products comprising such fibrous structures may be subjected to any post-processing operations such as embossing operations, printing operations, tuft-generating operations, thermal bonding operations, ultrasonic bonding operations, perforating operations, surface treatment operations such as application of lotions, silicones and/or other materials and mixtures thereof.

Any hydrophobic or non-hydrophilic materials within the fibrous structure, such as polypropylene filaments, may be surface treated and/or melt treated with a hydrophilic modifier. Nonlimiting examples of surface treating hydrophilic modifiers include surfactants, such as Triton X-100. Nonlimiting examples of melt treating hydrophilic modifiers that are added to the melt, such as the polypropylene melt, prior to spinning filaments, include hydrophilic modifying melt additives such as VW351 commercially available from Polyvel, Inc. and Irgasurf commercially available from Ciba. The hydrophilic modifier may be associated with the hydrophobic or non-hydrophilic material at any suitable level known in the art. In one example, the hydrophilic modifier is associated with the hydrophobic or non-hydrophilic material at a level of less than about 20% and/or less than about 15% and/or less than about 10% and/or less than about 5% and/or less than about 3% to about 0% by dry weight of the hydrophobic or non-hydrophilic material.

The fibrous structures of the present invention may include optional additives, each, when present, at individual levels of from about 0% and/or from about 0.01% and/or from about 0.1% and/or from about 1% and/or from about 2% to about 95% and/or to about 80% and/or to about 50% and/or to about 30% and/or to about 20% by dry weight of the fibrous structure. Nonlimiting examples of optional additives include permanent wet strength agents, temporary wet strength agents, dry strength agents such as carboxymethylcellulose and/or starch, softening agents, lint reducing agents, opacity increasing agents, wetting agents, odor absorbing agents, perfumes, temperature indicating agents, color agents, dyes, osmotic materials, microbial growth detection agents, antibacterial agents and mixtures thereof.

The fibrous structure of the present invention may itself be a sanitary tissue product. It may be convolutedly wound about a core to form a roll. It may be combined with one or more other fibrous structures as a ply to form a multi-ply sanitary tissue product. In one example, a co-formed fibrous structure of the present invention may be convolutedly wound about a core to form a roll of co-formed sanitary tissue product. The rolls of sanitary tissue products may also be coreless.

Figure 8:
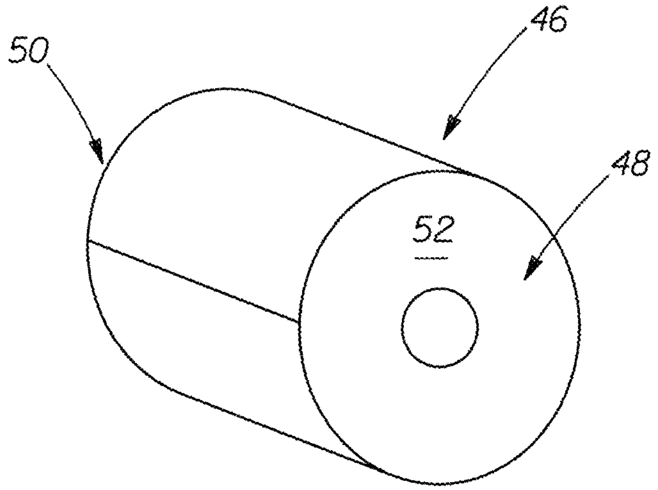
FIG. 8 is a schematic representation of another example of a fibrous structure in roll form according to the present invention.

As shown in FIG. 8, a fibrous structure roll 46 comprising a fibrous structure, such as a fibrous structure according to the present invention, comprises end edges 48, 50. At least one of the end edges 48, 50 comprises a bond region 52. The bond region 52 may comprise a plurality of bond subregions (not shown) that are present at a frequency of at least about 10 and/or at least about 50 and/or at least about 100 and/or at least about 200 per inch, such as dots per inch (dpi). In one example, the bond region 52 may cover the entire or substantially the entire surface area of the end edge 48. In one example, the bond region 52 comprises greater than about 20% and/or greater than about 25% and/or greater than about 30% and/or greater than about 50% of the total surface area of the end edge 48. In one example, the bond region 52 is a film that comprises the entire or substantially entire total surface area of the end edge 48. In another example, the bond region 52 is present on a non-lotioned fibrous structure.

The bond region 52 may comprise a bonding agent selected from chemical agents and/or mechanical agents. Nonlimiting examples of chemical agents include dry strength agents and wet strength agents and mixtures thereof. The mechanical agents may be in the form of a liquid and/or a solid. A liquid mechanical agent may be an oil. A solid mechanical agent may be a wax.

The bond region 52 may comprise different types of bonding agents and/or bonding agents that are chemically different from the filaments and/or fibers present in the fibrous structure. In one example, the material comprises a bonding agent, such as a dry strength resin such as a polysaccharide and/or a polysaccharide derivative and temporary and permanent wet strength resins. Nonlimiting examples of suitable bonding agents include latex dispersions, polyvinyl alcohol, Parez®, Kymene®, carboxymethylcellulose and starch.

Figure 9:
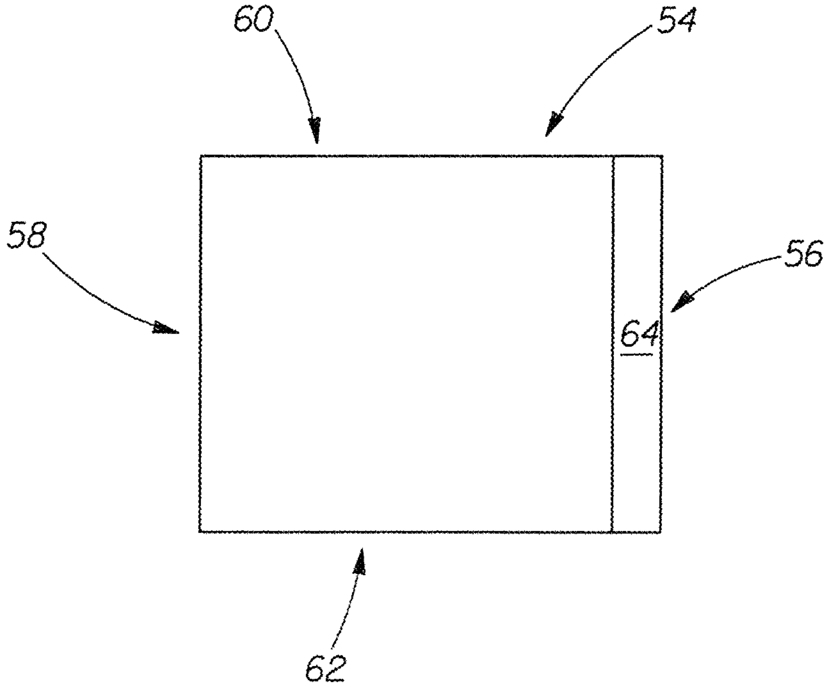
FIG. 9 is a schematic representation of another example of a fibrous structure.

As shown in FIG. 9, a fibrous structure 54 in accordance with the present invention may comprise edges 56, 58, 60, 62. One or more of the edges 56, 58, 60, 62 may comprise a bond region 64. The bond region 64 may extend inwardly from the edge 56, for example less than about 1 cm and/or less than about 0.5 cm. Any of the edges may comprise such a bond region. The bond region 64 may comprise a plurality of bond subregions (not shown) that are present at a frequency of at least 10 and/or at least 50 and/or at least 100 and/or at least 200 per inch, such as dots per inch (dpi). The bond region 64 may comprise a material chemically different from the filaments and/or fibers present in the fibrous structure. In one example, the material comprises a bonding agent, such as a dry strength resin such as a polysaccharide and/or a polysaccharide derivative. Nonlimiting examples of suitable bonding agents include carboxymethylcellulose and starch To further illustrate the fibrous structures of the present invention, Table 1 sets forth the average pore volume distributions of known and/or commercially available fibrous structures and a fibrous structure in accordance with the present invention.

TABLE 1

| Pore Radius (μm) | Huggies ® | Huggies ® Wash Cloth | Duramax | Concert EBT.055.1010 TBAL | LBAL-DUNI embossed | Bounty ® | Invention Example A | Invention Example B |
|---|---|---|---|---|---|---|---|---|
| 1 | 0 | 0 | 0 | 0 | 0 | 0 | 0 | 0 |
| 2.5 | 19.25 | 29.6 | 32.4 | 33.65 | 34.4 | 31.1 | 19.55 | 15.85 |
| 5 | 11.65 | 16.1 | 17.85 | 18.1 | 18.25 | 17.6 | 12.4 | 7.95 |
| 10 | 11.7 | 12.6 | 28.5 | 14.4 | 14.75 | 32.8 | 10.35 | 6.45 |
| 15 | 7.95 | 7.05 | 101.7 | 8.65 | 8.5 | 52.3 | 6.45 | 3.2 |
| 20 | 7.15 | 4.65 | 62.7 | 6.45 | 6.4 | 36.7 | 3.8 | 2.45 |
| 30 | 31.35 | 6.45 | 91.55 | 9.1 | 9.55 | 54 | 7.1 | 3.65 |
| 40 | 110.4 | 5.5 | 82.1 | 26.3 | 127.25 | 47.8 | 6.4 | 3.4 |
| 50 | 133.05 | 6.5 | 77.35 | 65.95 | 71.4 | 43.6 | 6.5 | 4.6 |
| 60 | 200.1 | 96.55 | 70.5 | 74.7 | 59.95 | 38.9 | 7.5 | 6.55 |
| 70 | 302.45 | 144.85 | 61.65 | 70.25 | 69.05 | 36.3 | 13.85 | 11.3 |
| 80 | 336.9 | 132.35 | 56.05 | 102.05 | 95.05 | 33.9 | 150.85 | 63.15 |
| 90 | 250.9 | 150.8 | 49.3 | 174.05 | 150.1 | 33 | 137.5 | 128 |
| 100 | 160.15 | 162.8 | 48.3 | 293 | 232.9 | 32.2 | 143.35 | 129.25 |
| 120 | 172.8 | 394.1 | 95.6 | 693.4 | 464.15 | 64.7 | 359.75 | 306.05 |
| 140 | 85.1 | 451.7 | 89.5 | 162.55 | 176.45 | 68.5 | 578.8 | 521.95 |
| 160 | 54 | 505.45 | 76.6 | 19.35 | 49.6 | 74.8 | 485.85 | 613.35 |
| 180 | 37.3 | 509.7 | 63.45 | 10.15 | 24.3 | 78.5 | 257.65 | 243.3 |
| 200 | 30.15 | 450.95 | 50 | 8.2 | 18.55 | 89.2 | 108.7 | 69.15 |
| 225 | 28.2 | 409.15 | 51.6 | 8.5 | 18.95 | 134.4 | 56.15 | 32.55 |
| 250 | 22.85 | 245.2 | 44 | 7.5 | 16.25 | 149.8 | 32.3 | 20.6 |
| 275 | 22.15 | 144.1 | 40.25 | 2.7 | 14.9 | 157.9 | 22.75 | 13.75 |
| 300 | 18.4 | 101.3 | 35.95 | 10.05 | 13.75 | 125.7 | 24.6 | 7.9 |
| 350 | 29.95 | 153.2 | 60.7 | 10.9 | 25.4 | 145 | 41.95 | 24.45 |
| 400 | 24.25 | 141.7 | 59.25 | 9.65 | 26.65 | 52.4 | 40.55 | 17.55 |
| 500 | 45.6 | 271.15 | 266.45 | 15.75 | 116.85 | 56 | 51.45 | 31.05 |
| 600 | 34.3 | 230.95 | 291.9 | 14.5 | 71.3 | 23.9 | 33.45 | 27.95 |
| 800 | 46.65 | 261.6 | 162.4 | 24.3 | 34.25 | 34.9 | 45.35 | 32.6 |
| 1000 | 38.75 | 112.55 | 29.15 | 24.9 | 30.35 | 24.9 | 34.6 | 25.55 |
| Total | 2273.45 | 5158.6 | 2196.75 | 1919.05 | 1999.25 | 1770.8 | 2699.5 | 2373.55 |
| 101-200 μm | 16.7% | 44.8% | 17.1% | 46.6% | 36.7% | 21.2% | 66.3% | 73.9% |
| 121-200 μm | 9.1% | 37.2% | 12.7% | 10.4% | 13.5% | 17.6% | 53.0% | 61.0% |

The fibrous structures of the present invention may exhibit a unique combination of fibrous structure properties that do not exist in known fibrous structures. For example, the fibrous structures may exhibit a VFS of greater than about 11 g/g and/or greater than about 12 g/g and/or greater than about 13 g/g and/or greater than about 14 g/g and/or less than about 50 g/g and/or less than about 40 g/g and/or less than about 30 g/g and/or less than about 20 g/g and/or from about 11 g/g to about 50 g/g and/or from about 11 g/g to about 40 g/g and/or from about 11 g/g to about 30 g/g and/or from about 11 g/g to about 20 g/g.

In addition to the VFS property, the fibrous structures of the present invention may exhibit a Dry CD Tensile Modulus of less than about 1500 g/cm and/or less than about 1400 g/cm and/or less than about 1300 g/cm and/or less than about 1100 g/cm and/or less than about 1000 g/cm and/or less than about 800 g/cm and/or greater than about 50 g/cm and/or greater than about 100 g/cm and/or greater than about 300 g/cm and/or from about 50 g/cm to about 1500 g/cm and/or from about 100 g/cm to about 1400 g/cm and/or from about 100 g/cm to about 1300 g/cm.

In addition to the VFS property and/or the Dry CD Tensile Modulus property, the fibrous structures of the present invention may exhibit a Wet CD TEA of greater than about 35 (g·in)/in$^2$ and/or greater than about 50 (g·in)/in$^2$ and/or greater than about 75 (g·in)/in$^2$ and/or greater than about 90 (g·in)/in$^2$ and/or greater than about 150 (g·in)/in$^2$ and/or greater than about 175 (g·in)/in$^2$ and/or less than about 500 (g·in)/in$^2$ and/or less than about 400 (g·in)/in$^2$ and/or less than about 350 (g·in)/in$^2$ and/or less than about 300 (g·in)/in$^2$ and/or from about 35 (g·in)/in$^2$ to about 500 (g·in)/in$^2$ and/or from about 35 (g·in)/in$^2$ to about 400 (g·in)/in$^2$ and/or from about 50 (g·in)/in$^2$ to about 350 (g·in)/in$^2$ and/or from about 75 (g·in)/in$^2$ to about 300 (g·in)/in$^2$.

In addition to the VFS property and/or the Dry CD Tensile Modulus property and/or the Wet CD TEA, the fibrous structures of the present invention may exhibit a Wet MD TEA of greater than about 40 (g·in)/in$^2$ and/or greater than about 50 (g·in)/in$^2$ and/or greater than about 75 (g·in)/in$^2$ and/or greater than about 90 (g·in)/in$^2$ and/or greater than about 150 (g·in)/in$^2$ and/or greater than about 175 (g·in)/in$^2$ and/or less than about 500 (g·in)/in$^2$ and/or less than about 400 (g·in)/in$^2$ and/or less than about 350 (g·in)/in$^2$ and/or less than about 300 (g·in)/in$^2$ and/or from about 40 (g·in)/in$^2$ to about 500 (g·in)/in$^2$ and/or from about 35 (g·in)/in$^2$ to about 400 (g·in)/in$^2$ and/or from about 50 (g·in)/in$^2$ to about 350 (g·in)/in$^2$ and/or from about 75 (g·in)/in$^2$ to about 300 (g·in)/in$^2$.

In one example of the fibrous structures of the present invention, the fibrous structure exhibits a VFS of greater than about 11 g/g and one or more of the following: a Dry CD Tensile Modulus of less than about 1500 g/cm and/or a Wet CD TEA of greater than about 35 (g·in)/in$^2$ and/or a Wet MD TEA of greater than about 40 (g·in)/in$^2$.

The values of these properties associated with a fibrous structure are determined according to the respective test methods described herein.

To further illustrate the fibrous structures of the present invention, Table 2 sets forth certain properties of known and commercially available fibrous structures and a fibrous structure in accordance with the present invention.

fluid-releasing holes, such as gas-releasing holes, in one example air-releasing holes, that provide attenuation to the filaments formed from the filament-forming holes. One or more fluid-releasing holes may be associated with a filament-forming hole such that the fluid exiting the fluid-releasing hole is parallel or substantially parallel (rather than angled like a knife-edge die) to an exterior surface of a filament exiting the filament-forming hole. In one example, the fluid exiting the fluid-releasing hole contacts the exterior surface of a filament formed from a filament-forming hole at an angle of less than 30° and/or less than 20° and/or less than 10° and/or less than 5° and/or about 0°. One or more fluid releasing holes may be arranged around a filament-forming hole. In one example, one or more fluid-releasing holes are associated with a single filament-forming hole such that the fluid exiting the one or more fluid releasing holes contacts the exterior surface of a single filament formed from the single filament-forming hole. In one example, the fluid-releasing hole permits a fluid, such as a gas, for example air, to contact the exterior surface of a filament formed from a filament-forming hole rather than contacting an inner surface of a filament, such as what happens when a hollow filament is formed.

TABLE 2

| Property | Duramax ® | Viva ® (Wetlaid) | Viva ® (Airlaid) | Bounty ® | Scott ® | Sparkle ® | Invention Example |
|---|---|---|---|---|---|---|---|
| Wet MD TEA (g · in)/in$^2$ | 377 | 21.4 | 34.5 | 22.4 | 16.7 | 14.8 | 90 |
| Wet CD TEA (g · in)/in$^2$ | 340 | 22.6 | 31.7 | 18.1 | 8.9 | 8.1 | 209 |
| Dry CD Tensile Modulus g/cm | 728 | 299 | 660 | 1844 | 1500 | 5900 | 400 |
| VFS g/g | 5.7 | 10.4 | 10.9 | 9.9 | 8 | 5.6 | 13 |

Process for Making a Fibrous Structure

Figure 10:
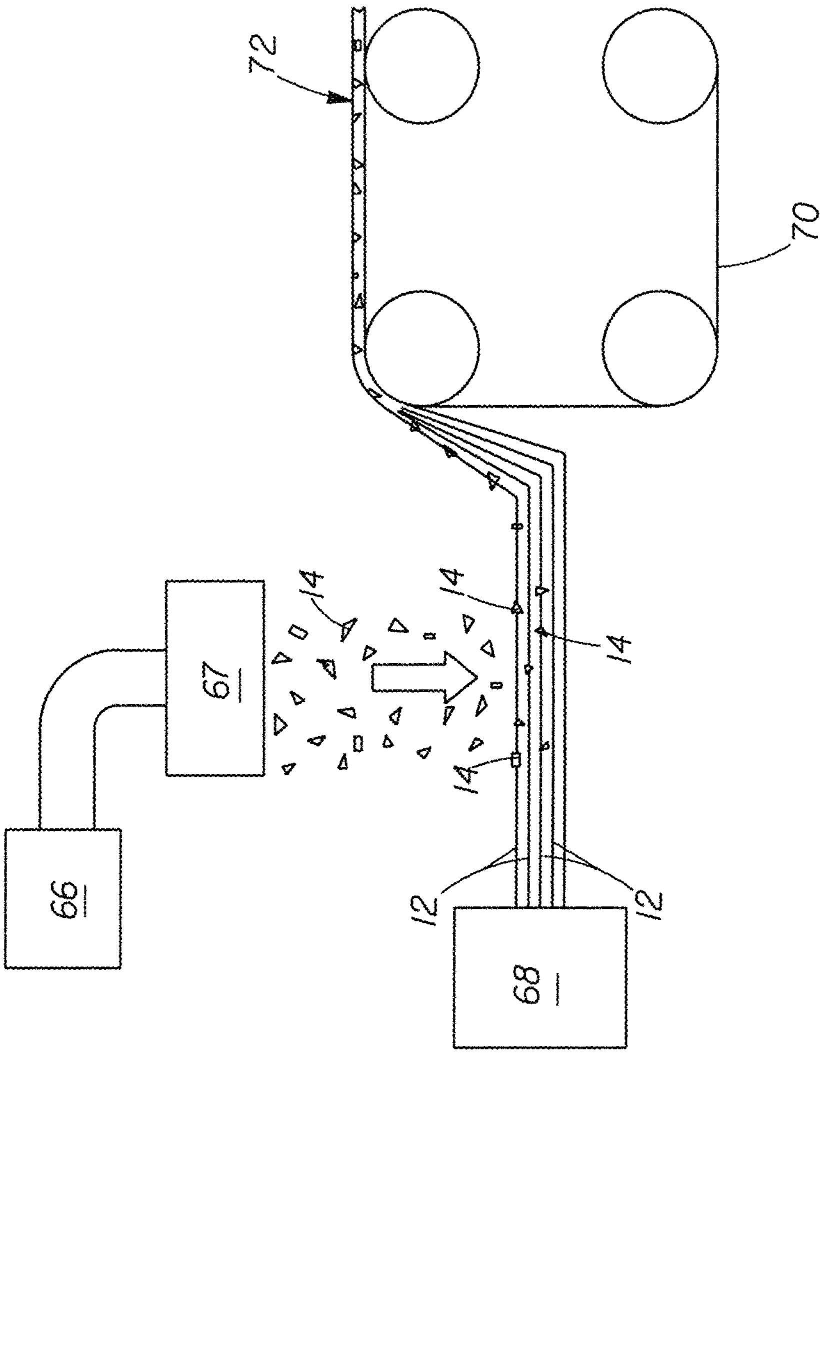
FIG. 10 is a schematic representation of an example of a process for making a fibrous structure according to the present invention.

A nonlimiting example of a process for making a fibrous structure according to the present invention is represented in FIG. 10. The process shown in FIG. 10 comprises the step of mixing a plurality of solid additives 14 with a plurality of filaments 12. In one example, the solid additives 14 are wood pulp fibers, such as SSK fibers and/or Eucalytpus fibers, and the filaments 12 are polypropylene filaments. The solid additives 14 may be combined with the filaments 12, such as by being delivered to a stream of filaments 12 from a hammermill 66 via a solid additive spreader 67 to form a mixture of filaments 12 and solid additives 14. The filaments 12 may be created by meltblowing from a meltblow die 68. The mixture of solid additives 14 and filaments 12 are collected on a collection device, such as a belt 70 to form a fibrous structure 72. The collection device may be a patterned and/or molded belt that results in the fibrous structure exhibiting a surface pattern, such as a non-random, repeating pattern. The molded belt may have a three-dimensional pattern on it that gets imparted to the fibrous structure 72 during the process.

Figure 11:
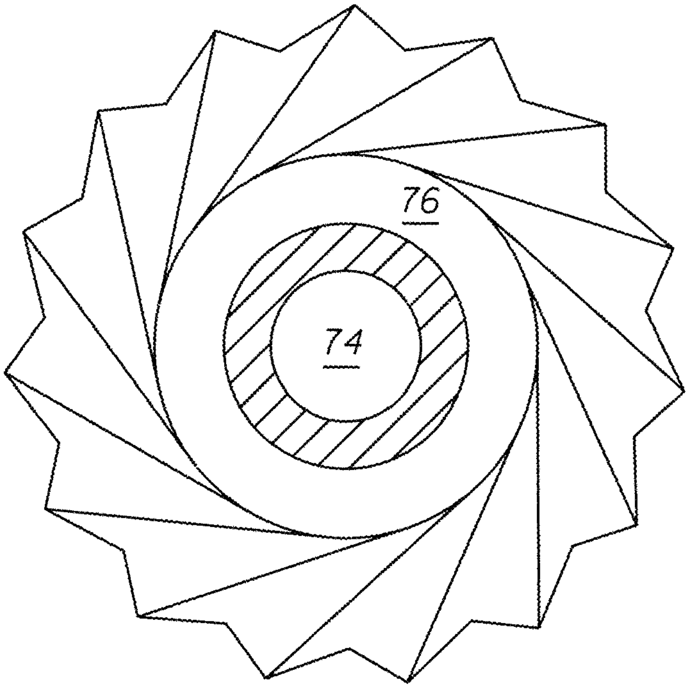
FIG. 11 is a schematic representation of an example of a filament-forming hole and fluid-releasing hole from a suitable die useful in making a fibrous structure according to the present invention.

In one example of the present invention, the fibrous structures are made using a die comprising at least one filament-forming hole, and/or 2 or more and/or 3 or more rows of filament-forming holes from which filaments are spun. At least one row of holes contains 2 or more and/or 3 or more and/or 10 or more filament-forming holes. In addition to the filament-forming holes, the die comprises In one example, the die comprises a filament-forming hole positioned within a fluid-releasing hole. The fluid-releasing hole 74 may be concentrically or substantially concentrically positioned around a filament-forming hole 76 such as is shown in FIG. 11.

Figure 12:
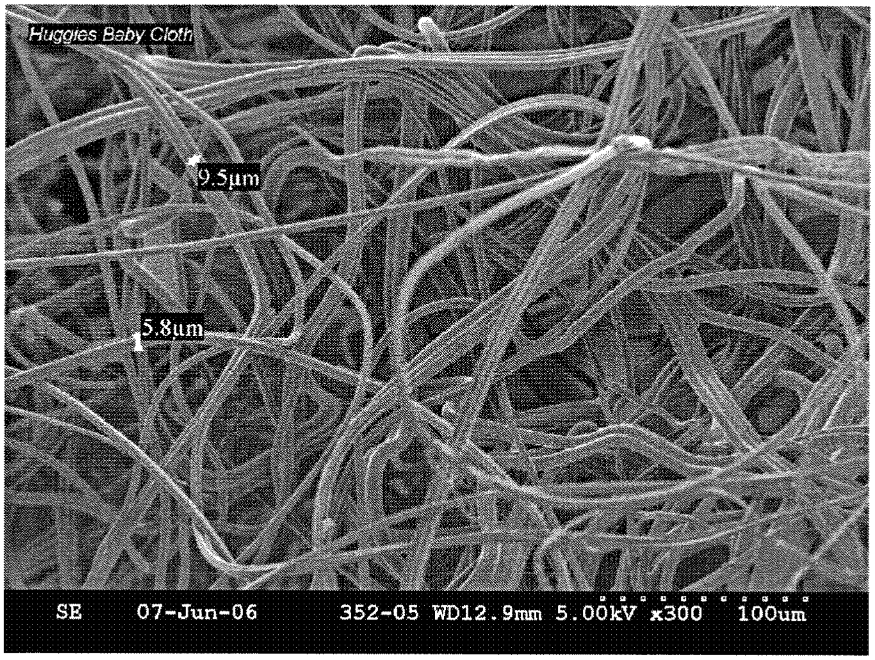
FIG. 12 is a scanning electromicrograph of a fibrous structure made by a known die.
Figure 13:
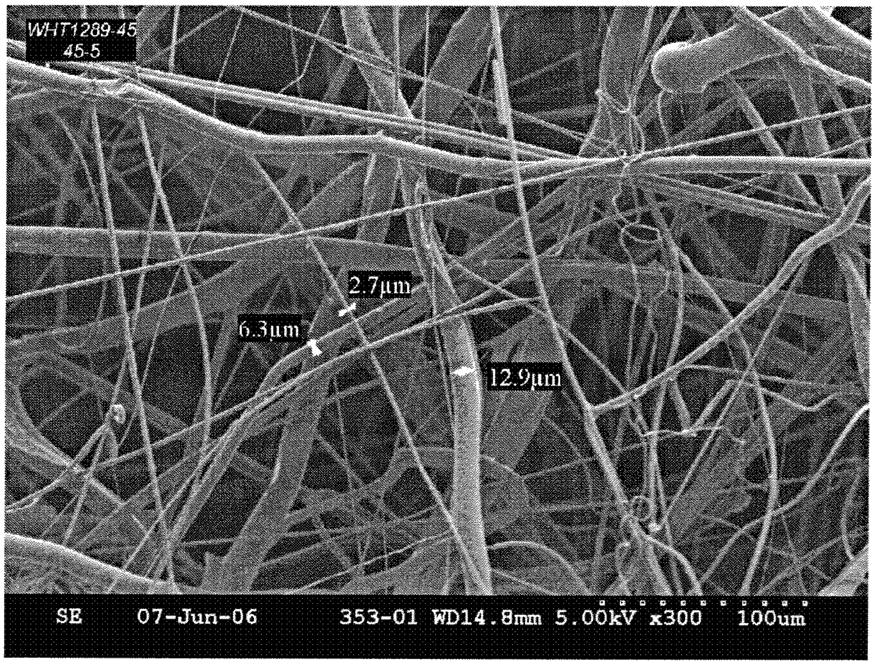
FIG. 13 is a scanning electromicrograph of a fibrous structure made by a die according to the present invention.

In another example, the die comprises filament-forming holes and fluid-releasing holes arranged to produce a plurality of filaments that exhibit a broader range of filament diameters than known filament-forming hole dies, such as knife-edge dies. For example, as shown in FIG. 12, a fibrous structure made by a known knife-edge die produces a fibrous structure comprising filaments having a narrower distribution of average filament diameters than a fibrous structure made by a die according to the present invention, as shown in FIG. 13. As is evidenced by FIG. 13, the fibrous structure made by a die according to the present invention may comprise filaments that exhibit an average filament diameter of less than 1 μm. Such filaments are not seen in the fibrous structure made by the known knife-edge die as shown in FIG. 12.

After the fibrous structure 72 has been formed on the collection device, the fibrous structure 72 may be subjected to post-processing operations such as embossing, thermal bonding, tuft-generating operations, moisture-imparting operations, and surface treating operations to form a finished fibrous structure. One example of a surface treating operation that the fibrous structure may be subjected to is the surface application of an elastomeric binder, such as ethylene vinyl acetate (EVA), latexes, and other elastomeric binders. Such an elastomeric binder may aid in reducing the lint created from the fibrous structure during use by consumers. The elastomeric binder may be applied to one or more surfaces of the fibrous structure in a pattern, especially a non-random repeating pattern, or in a manner that covers or substantially covers the entire surface(s) of the fibrous structure.

In one example, the fibrous structure 72 and/or the finished fibrous structure may be combined with one or more other fibrous structures. For example, another fibrous structure, such as a filament-containing fibrous structure, such as a polypropylene filament fibrous structure may be associated with a surface of the fibrous structure 72 and/or the finished fibrous structure. The polypropylene filament fibrous structure may be formed by meltblowing polypropylene filaments (filaments that comprise a second polymer that may be the same or different from the polymer of the filaments in the fibrous structure 72) onto a surface of the fibrous structure 72 and/or finished fibrous structure. In another example, the polypropylene filament fibrous structure may be formed by meltblowing filaments comprising a second polymer that may be the same or different from the polymer of the filaments in the fibrous structure 72 onto a collection device to form the polypropylene filament fibrous structure. The polypropylene filament fibrous structure may then be combined with the fibrous structure 72 or the finished fibrous structure to make a two-ply fibrous structure—three-ply if the fibrous structure 72 or the finished fibrous structure is positioned between two plies of the polypropylene filament fibrous structure like that shown in FIG. 5 for example. The polypropylene filament fibrous structure may be thermally bonded to the fibrous structure 72 or the finished fibrous structure via a thermal bonding operation.

In yet another example, the fibrous structure 72 and/or finished fibrous structure may be combined with a filament-containing fibrous structure such that the filament-containing fibrous structure, such as a polysaccharide filament fibrous structure, such as a starch filament fibrous structure, is positioned between two fibrous structures 72 or two finished fibrous structures like that shown in FIG. 6 for example.

The process for making fibrous structure 72 may be close coupled (where the fibrous structure is convolutedly wound into a roll prior to proceeding to a converting operation) or directly coupled (where the fibrous structure is not convolutedly wound into a roll prior to proceeding to a converting operation) with a converting operation to emboss, print, deform, surface treat, or other post-forming operation known to those in the art. For purposes of the present invention, direct coupling means that the fibrous structure 72 can proceed directly into a converting operation rather than, for example, being convolutedly wound into a roll and then unwound to proceed through a converting operation.

The process of the present invention may include preparing individual rolls of fibrous structure and/or sanitary tissue product comprising such fibrous structure(s) that are suitable for consumer use. The fibrous structure may be contacted by a bonding agent (such as an adhesive and/or dry strength agent), such that the ends of a roll of sanitary tissue product according to the present invention comprise such adhesive and/or dry strength agent.

The process may further comprise contacting an end edge of a roll of fibrous structure with a material that is chemically different from the filaments and fibers, to create bond regions that bond the fibers present at the end edge and reduce lint production during use. The material may be applied by any suitable process known in the art. Nonlimiting examples of suitable processes for applying the material include non-contact applications, such as spraying, and contact applications, such as gravure roll printing, extruding, surface transferring. In addition, the application of the material may occur by transfer from contact of a log saw and/or perforating blade containing the material since, for example, the perforating operation, an edge of the fibrous structure that may produce lint upon dispensing a fibrous structure sheet from an adjacent fibrous structure sheet may be created.

Nonlimiting Example of Process for Making a Fibrous Structure of the Present Invention A 47.5%: 47.5%: 5% blend of Exxon-Mobil PP3546 polypropylene:Sunoco CP200VM polypropylene:Polyvel S-1416 wetting agent is dry blended, to form a melt blend. The melt blend is heated to 475° F. through a melt extruder. A 10" wide Biax 12 row spinnerette with 192 nozzles per cross-direction inch, commercially available from Biax Fiberfilm Corporation, is utilized. 32 nozzles per cross-direction inch of the 192 nozzles have a 0.018" inside diameter while the remaining nozzles are solid, i.e. there is no opening in the nozzle. Approximately 0.17 grams per hole per minute (ghm) of the melt blend is extruded from the open nozzles to form meltblown filaments from the melt blend. Approximately 200 SCFM of compressed air is heated such that the air exhibits a temperature of 395° F. at the spinnerette. Approximately 175 grams/minute of Koch 4825 semi-treated SSK pulp is defibrillated through a hammermill to form SSK wood pulp fibers (solid additive). 330 SCFM of air at 85-90° F. and 85% relative humidity (RH) is drawn into the hammermill and carries the pulp fibers to a solid additive spreader. The solid additive spreader turns the pulp fibers and distributes the pulp fibers in the cross-direction such that the pulp fibers are injected into the meltblown filaments in a perpendicular fashion through a 2"×10" cross-direction (CD) slot. A forming box surrounds the area where the meltblown filaments and pulp fibers are commingled. This forming box is designed to reduce the amount of air allowed to enter or escape from this commingling area; however, there is a 2"×12" opening in the bottom of the forming box designed to permit additional cooling air to enter. A forming vacuum pulls air through a forming fabric thus collecting the commingled meltblown filaments and pulp fibers to form a fibrous structure. The forming vacuum is adjusted until an additional 400 SCFM of room air is drawn into the slot in the forming box. The fibrous structure formed by this process comprises about 75% by dry fibrous structure weight of pulp and about 25% by dry fibrous structure weight of meltblown filaments.

Figure 14:
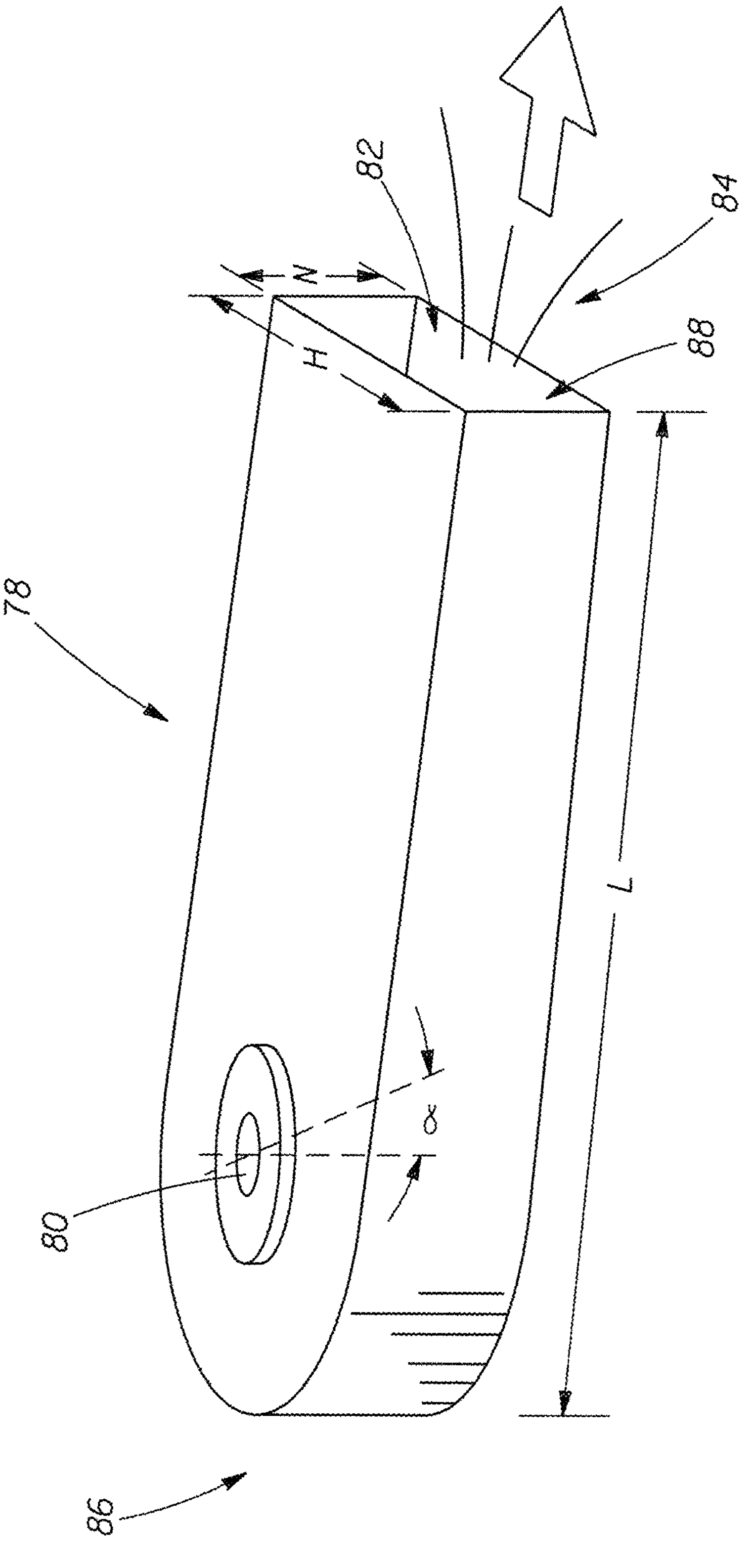
FIG. 14 is a schematic representation of an example of a solid additive spreader useful in the processes of the present invention.
Figure 15:
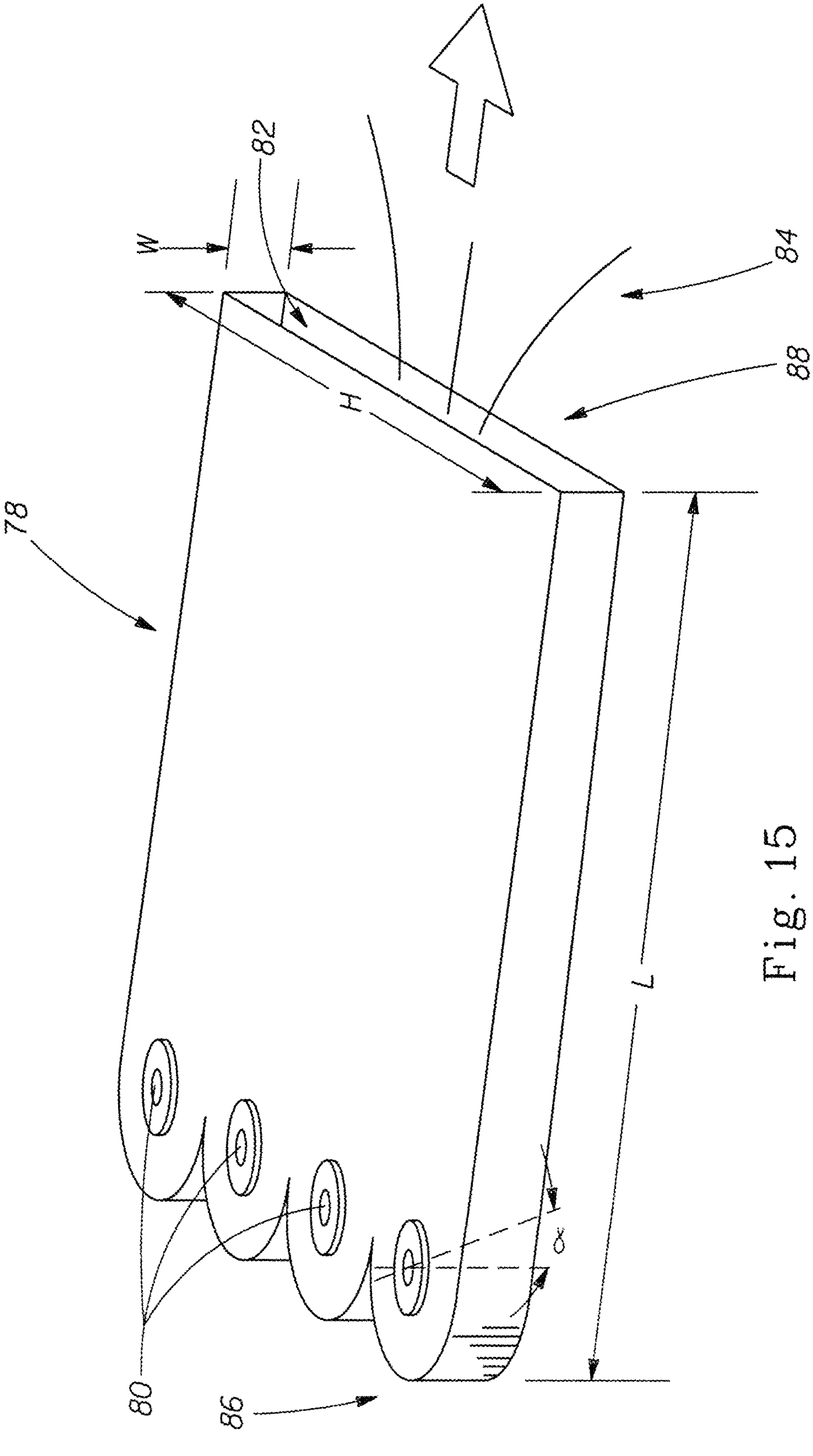
FIG. 15 is a schematic representation of another example of a solid additive spreader useful in the processes of the present invention.

As shown in FIG. 14, the solid additive spreader 78 has an inlet 80 and an exit 82. Any suitable material known in the art may be used to make the spreader 78. Nonlimiting examples of suitable materials include non-conductive materials. For example, stainless steel and/or sheet metal may be used to fabricate the spreader 78. A pulp and air mixture 84 created in the hammermill (not shown) enters the spreader 78 through a duct (not shown) connecting the hammermill and spreader 78 at greater than about 8,000 fpm velocity and/or greater than about 14,000 fpm. The inlet 80 is tilted at an angle $\alpha$ at approximately 5° upstream from perpendicular of the exit 82. The exit 82 of the solid additive spreader 78 has a height H in the range of about 2.54 cm (1 inch) to about 25.40 cm (10 inches). The width W of the exit 82 is from about 1.27 cm (0.5 inch) to about 10.16 cm (4 inches). Typically the width W of the exit 82 is about 5.08 cm (2 inches). The length L of the spreader 78 is from about 60.96 cm (24 inches) to about 243.84 cm (96 inches) and/or from about 91.44 cm (36 inches) to about 182.88 cm (72 inches) and/or from about 121.92 cm (48 inches) to about 152.40 cm (60 inches). A tapering of the height H of the spreader 78 occurs from the inlet end 86 to the exit end 88 to continually accelerate the pulp and air mixture 84. This tapering is from about 10.16 cm (4 inches) in height at the inlet 80 to about 5.08 cm (2 inches) in height at the exit 82. However, the spreader 78 may incorporate other similar taperings. The inlet end 86 of the spreader 78 has a semi-circular arc from the top view with a radius of from about 7.62 cm (3 inches) to about 50.80 cm (20 inches) and/or from about 12.70 cm (5 inches) to about 25.40 cm (10 inches). As shown in FIG. 15, multiple semi-circular arcs can be assembled to produce the desired spreader width. Each semi-circular arc would comprise its own inlet 80 centered in each of these semi-circular arcs.

Optionally, a meltblown layer of the meltblown filaments can be added to one or both sides of the above formed fibrous structure. This addition of the meltblown layer can help reduce the lint created from the fibrous structure during use by consumers and is preferably performed prior to any thermal bonding operation of the fibrous structure. The meltblown filaments for the exterior layers can be the same or different than the meltblown filaments used on the opposite layer or in the center layer(s).

The fibrous structure may be convolutedly wound to form a roll of fibrous structure. The end edges of the roll of fibrous structure may be contacted with a material to create bond regions.

Test Methods

Unless otherwise indicated, all tests described herein including those described under the Definitions section and the following test methods are conducted on samples that have been conditioned in a conditioned room at a temperature of 73° F.±4° F. (about 23° C.±2.2° C.) and a relative humidity of 50%±10% for 2 hours prior to the test. Samples conditioned as described herein are considered dry samples (such as "dry fibrous structures") for purposes of this invention. Further, all tests are conducted in such conditioned room.

A. Pore Volume Distribution Test Method

Pore Volume Distribution measurements are made on a TRI/Autoporosimeter (TRI/Princeton Inc. of Princeton, NJ). The TRI/Autoporosimeter is an automated computer-controlled instrument for measuring pore volume distributions in porous materials (e.g., the volumes of different size pores within the range from 1 to 1000 □μm effective pore radii). Complimentary Automated Instrument Software, Release 2000.1, and Data Treatment Software, Release 2000.1 is used to capture, analyze and output the data. More information on the TRI/Autoporosimeter, its operation and data treatments can be found in The Journal of Colloid and Interface Science 162 (1994), pgs 163-170, incorporated here by reference.

As used in this application, determining Pore Volume Distribution involves recording the increment of liquid that enters a porous material as the surrounding air pressure changes. A sample in the test chamber is exposed to precisely controlled changes in air pressure. The size (radius) of the largest pore able to hold liquid is a function of the air pressure. As the air pressure increases (decreases), different size pore groups drain (absorb) liquid. The pore volume of each group is equal to this amount of liquid, as measured by the instrument at the corresponding pressure. The effective radius of a pore is related to the pressure differential by the following relationship.

$$\text{Pressure differential}=[(2)\gamma \cos \Theta]/\text{effective radius}$$

where γ=liquid surface tension, and Θ=contact angle.

Typically pores are thought of in terms such as voids, holes or conduits in a porous material. It is important to note that this method uses the above equation to calculate effective pore radii based on the constants and equipment controlled pressures. The above equation assumes uniform cylindrical pores. Usually, the pores in natural and manufactured porous materials are not perfectly cylindrical, nor all uniform. Therefore, the effective radii reported here may not equate exactly to measurements of void dimensions obtained by other methods such as microscopy. However, these measurements do provide an accepted means to characterize relative differences in void structure between materials.

The equipment operates by changing the test chamber air pressure in user-specified increments, either by decreasing pressure (increasing pore size) to absorb liquid, or increasing pressure (decreasing pore size) to drain liquid. The liquid volume absorbed (drained) at each pressure increment is the cumulative volume for the group of all pores between the preceding pressure setting and the current setting.

In this application of the TRI/Autoporosimeter, the liquid is a 0.2 weight % solution of octylphenoxy polyethoxy ethanol (Triton X-100 from Union Carbide Chemical and Plastics Co. of Danbury, CT.) in distilled water. The instrument calculation constants are as follows: ρ (density)=1 g/cm$^3$; γ (surface tension)=31 dynes/cm; cos Θ=1. A 0.22 μm Millipore Glass Filter (Millipore Corporation of Bedford, MA; Catalog #GSWP09025) is employed on the test chamber's porous plate. A Plexiglass plate weighing about 24 g (supplied with the instrument) is placed on the sample to ensure the sample rests flat on the Millipore Filter. No additional weight is placed on the sample.

The remaining user specified inputs are described below. The sequence of pore sizes (pressures) for this application is as follows (effective pore radius in μm): 1, 2.5, 5, 10, 15, 20, 30, 40, 50, 60, 70, 80, 90, 100, 120, 140, 160, 180, 200, 225, 250, 275, 300, 350, 400, 500, 600, 800, 1000. This sequence starts with the sample dry, saturates it as the pore settings increase (typically referred to with respect to the procedure and instrument as the 1$^{st}$ absorption).

In addition to the test materials, a blank condition (no sample between Plexiglass plate and Millipore Filter) is run to account for any surface and/or edge effects within the chamber. Any pore volume measured for this blank run is subtracted from the applicable pore grouping of the test sample. This data treatment can be accomplished manually or with the available TRI/Autoporosimeter Data Treatment Software, Release 2000.1.

Percent (%) Total Pore Volume is a percentage calculated by taking the volume of fluid in the specific pore radii range divided by the Total Pore Volume. The TRI/Autoporosimeter outputs the volume of fluid within a range of pore radii. The first data obtained is for the "2.5 micron" pore radii which includes fluid absorbed between the pore sizes of 1 to 2.5 micron radius. The next data obtained is for "5 micron" pore radii, which includes fluid absorbed between the 2.5 micron and 5 micron radii, and so on. Following this logic, to obtain the volume held within the range of 101-200 micron radii, one would sum the volumes obtained in the range titled "120 micron", "140 micron", "160 micron", "180 micron", and finally the "200 micron" pore radii ranges. For example, %

Total Pore Volume 101-200 micron pore radii=(volume of fluid between 101-200 micron pore radii)/Total Pore Volume B. Horizontal Full Sheet (HFS) Test Method The Horizontal Full Sheet (HFS) test method determines the amount of distilled water absorbed and retained by a fibrous structure of the present invention. This method is performed by first weighing a sample of the fibrous structure to be tested (referred to herein as the "dry weight of the sample"), then thoroughly wetting the sample, draining the wetted sample in a horizontal position and then reweighing (referred to herein as "wet weight of the sample"). The absorptive capacity of the sample is then computed as the amount of water retained in units of grams of water absorbed by the sample. When evaluating different fibrous structure samples, the same size of fibrous structure is used for all samples tested.

The apparatus for determining the HFS capacity of fibrous structures comprises the following:

1) An electronic balance with a sensitivity of at least ±0.01 grams and a minimum capacity of 1200 grams. The balance should be positioned on a balance table and slab to minimize the vibration effects of floor/benchtop weighing. The balance should also have a special balance pan to be able to handle the size of the sample tested (i.e.; a fibrous structure sample of about 11 in. (27.9 cm) by 11 in. (27.9 cm)). The balance pan can be made out of a variety of materials. Plexiglass is a common material used.

Figure 16A:
FIG. 16A is a cross-sectional view taken along line 16A-16A of FIG. 16.
Figure 16:
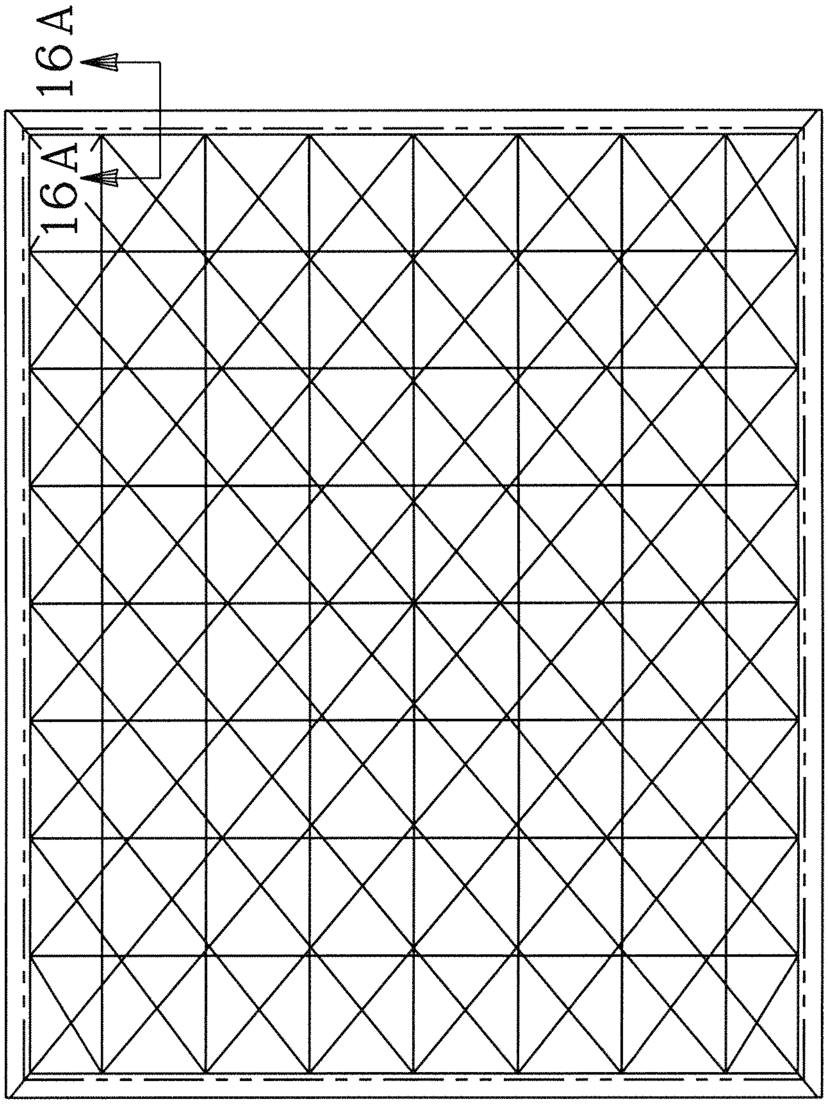
FIG. 16 is a diagram of a support rack utilized in the HFS and VFS Test Methods described herein.
Figure 17A:
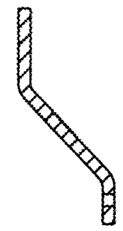
FIG. 17A is a cross-sectional view taken along line 17A-17A of FIG. 17.
Figure 17:
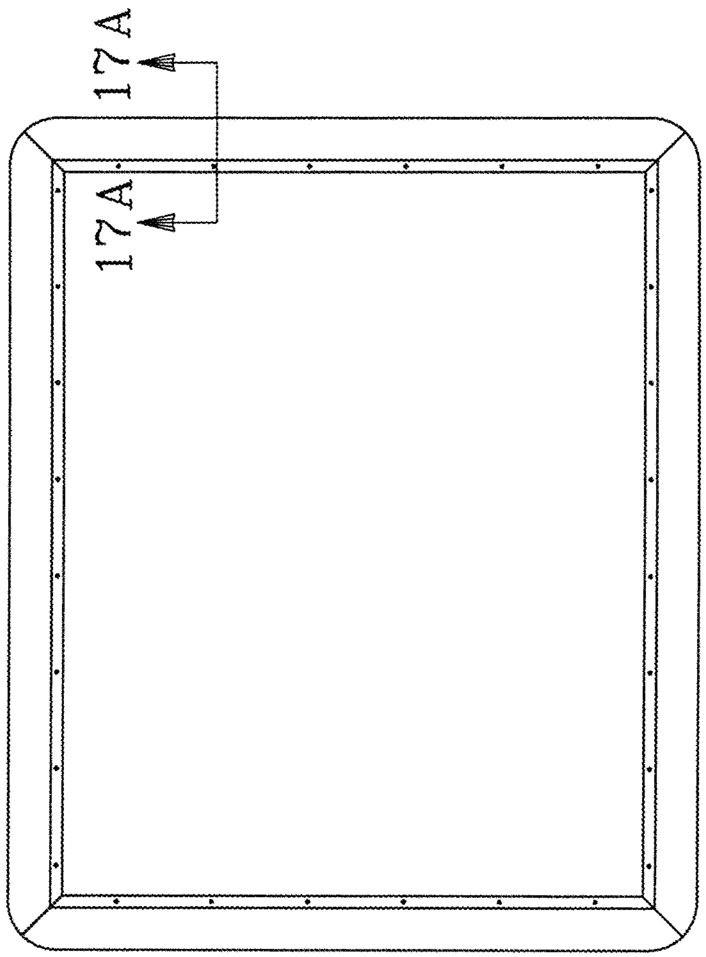
FIG. 17 is a diagram of a support rack cover utilized in the HFS and VFS Test Methods described herein.

2) A sample support rack (FIG. 16) and sample support rack cover (FIG. 17) is also required. Both the rack and cover are comprised of a lightweight metal frame, strung with 0.012 in. (0.305 cm) diameter monofilament so as to form a grid as shown in FIG. 16. The size of the support rack and cover is such that the sample size can be conveniently placed between the two.

The HFS test is performed in an environment maintained at 23±1° C. and 50±2% relative humidity. A water reservoir or tub is filled with distilled water at 23±1° C. to a depth of 3 inches (7.6 cm).

Eight samples of a fibrous structure to be tested are carefully weighed on the balance to the nearest 0.01 grams. The dry weight of each sample is reported to the nearest 0.01 grams. The empty sample support rack is placed on the balance with the special balance pan described above. The balance is then zeroed (tared). One sample is carefully placed on the sample support rack. The support rack cover is placed on top of the support rack. The sample (now sandwiched between the rack and cover) is submerged in the water reservoir. After the sample is submerged for 60 seconds, the sample support rack and cover are gently raised out of the reservoir.

The sample, support rack and cover are allowed to drain horizontally for 120±5 seconds, taking care not to excessively shake or vibrate the sample. While the sample is draining, the rack cover is carefully removed and all excess water is wiped from the support rack. The wet sample and the support rack are weighed on the previously tared balance. The weight is recorded to the nearest 0.01 g. This is the wet weight of the sample.

The gram per fibrous structure sample absorptive capacity of the sample is defined as (wet weight of the sample−dry weight of the sample). The horizontal absorbent capacity (HAC) is defined as: absorbent capacity=(wet weight of the sample−dry weight of the sample)/(dry weight of the sample) and has a unit of gram/gram.

C. Vertical Full Sheet (VFS) Test Method

The Vertical Full Sheet (VFS) test method determines the amount of distilled water absorbed and retained by a fibrous structure of the present invention. This method is performed by first weighing a sample of the fibrous structure to be tested (referred to herein as the "dry weight of the sample"), then thoroughly wetting the sample, draining the wetted sample in a vertical position and then reweighing (referred to herein as "wet weight of the sample"). The absorptive capacity of the sample is then computed as the amount of water retained in units of grams of water absorbed by the sample. When evaluating different fibrous structure samples, the same size of fibrous structure is used for all samples tested.

The apparatus for determining the VFS capacity of fibrous structures comprises the following:

1) An electronic balance with a sensitivity of at least ±0.01 grams and a minimum capacity of 1200 grams. The balance should be positioned on a balance table and slab to minimize the vibration effects of floor/benchtop weighing. The balance should also have a special balance pan to be able to handle the size of the sample tested (i.e.; a fibrous structure sample of about 11 in. (27.9 cm) by 11 in. (27.9 cm)). The balance pan can be made out of a variety of materials. Plexiglass is a common material used.

2) A sample support rack (FIG. 16) and sample support rack cover (FIG. 17) is also required. Both the rack and cover are comprised of a lightweight metal frame, strung with 0.012 in. (0.305 cm) diameter monofilament so as to form a grid as shown in FIG. 16. The size of the support rack and cover is such that the sample size can be conveniently placed between the two.

The VFS test is performed in an environment maintained at 23±1° C. and 50±2% relative humidity. A water reservoir or tub is filled with distilled water at 23±1° C. to a depth of 3 inches (7.6 cm).

Eight 19.05 cm (7.5 inch)×19.05 cm (7.5 inch) to 27.94 cm (11 inch)×27.94 cm (11 inch) samples of a fibrous structure to be tested are carefully weighed on the balance to the nearest 0.01 grams. The dry weight of each sample is reported to the nearest 0.01 grams. The empty sample support rack is placed on the balance with the special balance pan described above. The balance is then zeroed (tared). One sample is carefully placed on the sample support rack. The support rack cover is placed on top of the support rack. The sample (now sandwiched between the rack and cover) is submerged in the water reservoir. After the sample is submerged for 60 seconds, the sample support rack and cover are gently raised out of the reservoir.

The sample, support rack and cover are allowed to drain vertically for 60±5 seconds, taking care not to excessively shake or vibrate the sample. While the sample is draining, the rack cover is carefully removed and all excess water is wiped from the support rack. The wet sample and the support rack are weighed on the previously tared balance. The weight is recorded to the nearest 0.01 g. This is the wet weight of the sample.

The procedure is repeated for with another sample of the fibrous structure, however, the sample is positioned on the support rack such that the sample is rotated 90° compared to the position of the first sample on the support rack.

The gram per fibrous structure sample absorptive capacity of the sample is defined as (wet weight of the sample−dry weight of the sample). The calculated VFS is the average of the absorptive capacities of the two samples of the fibrous structure.

D. Wet MD TEA, Wet CD TEA, Dry CD Tensile Modulus ("Tangent Modulus") Test Methods The Wet MD TEA, Wet CD TEA and Dry CD Tensile Modulus of a fibrous structure are all determined using a Thwing Albert EJA Tensile Tester. A 2.54 cm (1 inch) wide strip of the fibrous structure to be tested is placed in the grips of the Tensile Tester at a gauge length of 10.16 cm (4 inches). The Crosshead Speed of the Tensile Tester is set at 10.16 cm/min (4 inches/min) and the Break Sensitivity is set at 20 g. Eight (8) samples are run on the Tensile Tester and an average of the respective Wet MD TEA, Wet CD TEA values from the 8 samples is reported as the Wet MD TEA value and the Wet CD TEA. The Dry CD Tensile Modulus is reported as the average of the Dry CD Tensile Modulus from the 8 samples measured at 15 g/cm.

E. Basis Weight Test Method

Basis weight is measured by preparing one or more samples of a certain area ($m^2$) and weighing the sample(s) of a fibrous structure according to the present invention and/or a paper product comprising such fibrous structure on a top loading balance with a minimum resolution of 0.01 g. The balance is protected from air drafts and other disturbances using a draft shield. Weights are recorded when the readings on the balance become constant. The average weight (g) is calculated and the average area of the samples ($m^2$). The basis weight ($g/m^2$) is calculated by dividing the average weight (g) by the average area of the samples ($m^2$).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for making a fibrous structure, the process comprising the steps of:

a. providing a die comprising two or more rows of filament-forming holes and fluid-releasing holes associated with the filament-forming holes;

b. supplying at least a first polymer to the die;

c. supplying a fluid to the die such that the fluid exits the fluid-releasing holes;

d. producing a plurality of filaments comprising the first polymer from at least one row of the die, such that the diameter of the plurality of filaments produced from the first polymer differs from the diameter of a plurality of filaments produced from at least one other row of filament forming holes;

e. combining the plurality of filaments with solid additives to form a mixture; and f. collecting the mixture on a collection device to produce a fibrous structure.

2. The process according to claim 1 wherein one or more fluid-releasing holes are associated with one filament-forming hole such that a fluid exiting the fluid-releasing hole contacts an exterior surface of a filament exiting the filament-forming hole.

3. The process according to claim 1 wherein more than one fluid-releasing hole is associated with a filament-forming hole.

4. The process according to claim 1 wherein one fluid-releasing hole is concentrically positioned around one filament-forming hole.

5. The process according to claim 1 wherein the first polymer comprises a synthetic polymer.

6. The process according to claim 5 wherein the synthetic polymer is selected from the group consisting of: polyvinyl alcohol, polyvinyl alcohol derivatives, polyesters, nylons, polyolefins, polylactic acids, polyhydroxyalkanoates, polycaprolactones and mixtures thereof.

7. The process according to claim 5 wherein the synthetic polymer comprises a polyolefin.

8. The process according to claim 7 wherein the polyolefin comprises polypropylene.

9. The process according to claim 1 wherein the first polymer comprises a natural polymer.

10. The process according to claim 9 wherein the natural polymer is selected from the group consisting of: starch, starch derivatives, cellulose, cellulose derivatives, hemicellulose, hemicellulose derivatives and mixtures thereof.

11. The process according to claim 1 wherein the first polymer comprises a compostable polymer.

12. The process according to claim 11 wherein the compostable polymer is selected from the group consisting of: polylactic acids, polyhydroxyalkanoates, polycaprolactones and mixtures thereof.

13. The process according to claim 1 wherein the solid additives comprise fibers.

14. The process according to claim 13 wherein the fibers comprise wood pulp fibers.

* * * * *